(12) United States Patent
Kalevo

(10) Patent No.: US 12,015,790 B2
(45) Date of Patent: Jun. 18, 2024

(54) ENCODER, DECODER AND METHOD EMPLOYING PALETTE COMPRESSION

(71) Applicant: GURULOGIC MICROSYSTEMS OY, Turku (FI)

(72) Inventor: Ossi Kalevo, Akaa (FI)

(73) Assignee: GURULOGIC MICROSYSTEMS OY, Turku (FI)

( * ) Notice: Subject to any disclaimer, the term of this patent is extended or adjusted under 35 U.S.C. 154(b) by 0 days.

(21) Appl. No.: 15/736,653

(22) PCT Filed: Jun. 20, 2016

(86) PCT No.: PCT/EP2016/025064
§ 371 (c)(1),
(2) Date: Dec. 14, 2017

(87) PCT Pub. No.: WO2016/202469
PCT Pub. Date: Dec. 22, 2016

(65) Prior Publication Data
US 2018/0176585 A1    Jun. 21, 2018

(30) Foreign Application Priority Data
Jun. 18, 2015    (GB) ..................................... 1510745

(51) Int. Cl.
*H04N 19/186* (2014.01)
*H04N 19/463* (2014.01)
*H04N 19/91* (2014.01)

(52) U.S. Cl.
CPC ......... *H04N 19/186* (2014.11); *H04N 19/463* (2014.11); *H04N 19/91* (2014.11)

(58) Field of Classification Search
CPC ..... H04N 19/186; H04N 19/463; H04N 19/91
See application file for complete search history.

(56) References Cited

U.S. PATENT DOCUMENTS

2002/0149679 A1*  10/2002  Deangelis ................ G07C 1/24
                                                                  348/157
2005/0276489 A1*  12/2005  Ishikawa ................. H04N 1/644
                                                                  382/232

(Continued)

FOREIGN PATENT DOCUMENTS

| CN | 106105228 | * 11/2016 | ............. H04N 19/80 |
| GB | 2 371 730 A | 7/2002 | |
| WO | 2015/077720 A1 | 5/2015 | |

OTHER PUBLICATIONS

Great Britain Examination Report, dated May 17, 2018, issued in corresponding Great Britain Application No. GB1510745.1, 2 pages.

(Continued)

*Primary Examiner* — Zhiyu Lu
(74) *Attorney, Agent, or Firm* — FOLEY & LARDNER LLP

(57) ABSTRACT

A method of encoding input data to generate corresponding encoded data is provided. The method includes encoding the input data into a plurality of symbols in the encoded data, wherein the plurality of symbols represent data as defined by at least one palette included in the encoded data. The method further includes compressing data representative of the at least one palette into compressed palette data in a lossless manner for inclusion into the encoded data, wherein palette entry values of the at least one palette are provided consecutively within the encoded data.

15 Claims, 13 Drawing Sheets

Palette

| I | A | B | C |
|---|-----|-----|-----|
| 0 | 235 | 97  | 61  |
| 1 | 125 | 166 | 61  |
| 2 | 125 | 71  | 204 |
| 3 | 0   | 102 | 204 |

(56) References Cited

U.S. PATENT DOCUMENTS

| | | | |
|---|---|---|---|
| 2007/0025631 A1* | 2/2007 | Kim | H04N 19/119 |
| | | | 382/248 |
| 2010/0214577 A1* | 8/2010 | Owen | H04N 1/6016 |
| | | | 358/1.9 |
| 2011/0038408 A1* | 2/2011 | Jacob | H04N 21/440227 |
| | | | 375/240.01 |
| 2014/0147040 A1 | 5/2014 | Tanaka et al. | |
| 2015/0016501 A1 | 1/2015 | Guo et al. | |
| 2015/0146976 A1* | 5/2015 | Ma | H04N 1/646 |
| | | | 382/166 |
| 2015/0186100 A1* | 7/2015 | Tsai | H04N 19/70 |
| | | | 375/240.12 |
| 2015/0189302 A1* | 7/2015 | Pu | H04N 19/176 |
| | | | 375/240.24 |
| 2015/0189319 A1* | 7/2015 | Pu | H04N 19/46 |
| | | | 375/240.03 |
| 2015/0264363 A1* | 9/2015 | Pu | H04N 19/70 |
| | | | 375/240.02 |
| 2015/0281703 A1* | 10/2015 | Zou | H04N 19/94 |
| | | | 375/240.24 |
| 2015/0281728 A1* | 10/2015 | Karczewicz | H04N 19/593 |
| | | | 375/240.16 |
| 2015/0341643 A1* | 11/2015 | Xu | H04N 19/136 |
| | | | 375/240.02 |
| 2015/0341655 A1* | 11/2015 | Joshi | H04N 19/50 |
| | | | 375/240.16 |
| 2015/0365670 A1* | 12/2015 | Chang | H04N 19/103 |
| | | | 375/240.02 |
| 2015/0365671 A1* | 12/2015 | Pu | H04N 19/117 |
| | | | 375/240.03 |
| 2015/0365695 A1* | 12/2015 | Pu | H04N 19/82 |
| | | | 375/240.16 |
| 2016/0255355 A1* | 9/2016 | Andersson | H04N 19/40 |
| | | | 375/240.02 |
| 2019/0149843 A1* | 5/2019 | Tsai | H04N 19/93 |
| | | | 375/240.03 |

OTHER PUBLICATIONS

Great Britain Search and Examination Report under Sections 17 and 18(3), dated Oct. 18, 2018, issued in Great Britain Application No. GB1510745.1, 6 pages.

High Efficiency Video Coding (HEVC) Screen Content Coding: Draft 3, Feb. 2015; JCT-VC T1005; available at http://phenix.int-evry.fr/jct/doc_end_user/current_document.php?id=10025 [accessed Oct. 16, 2018]; 1 page.

Notification of Transmittal of The International Preliminary Report on Patentability issued in International Application No. PCT/EP2016/025064 dated Sep. 20, 2017.

Written Opinion of the International Searching Authority issued in International Application No. PCT/EP2016/025064 dated Jul. 27, 2016.

Notification of Transmittal of The International Search Report and The Written Opinion of the International Searching Authority, or the Declaration issued in International Application No. PCT/EP2016/025064 dated Jul. 27, 2016.

Combined Search and Examination Report under Sections 17 and 18(3) issued in Application No. GB1510745.1 dated Dec. 18, 2015.

Examination Report under Section 18(3) issued in Application No. GB1510745.1 dated Apr. 12, 2017.

Yu-Chen Sun et al., "AHG10: A triplet palette mode combining JCTVC-P0108 and JCTVC-P0198," Joint Collaborative Team on Video Coding (JCT-VC) of ITU-T SG 6 WP 3 and ISO/IEC JTC 1/SC 29/WB 11, 17th Meeting: Valencia, ES, Mar. 27-Apr. 4, 2014, Date Saved: Mar. 18, 2014, Document: JCTVC-Q0083, pp. 1-9.

Syntax and semantics description, Joint Collaborative Team on Video Coding (JCT-VC) of ITU-T SG16 WP3 and ISO/IEC JTC1/SC29/WG11, 17th Meeting: Valencia, ES, Mar. 27-Apr. 4, 2014, Date saved: Mar. 27, 2014, Document: JCTVC-Q0083, pp. 1-7.

Yu-Chen Sun et al., "AHG10: A triplet palette mode combining JCTVC-P0108 and JCTVC-P0198," Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, Document: JCTVC-Q0083, Date Saved: Mar. 27, 2014, pp. 1-9.

C. Gisquet et al., "AHG10: palette predictor stuffing," Joint Collaborative Team on Video Coding (JCT-VC) of ITU-T SG 16 WP 3 and ISO/IEC JTC 1/SC 29/WG 11, 17th Meeting: Valencia, ES, Mar. 27-Apr. 4, 2014, Document: JCTVC-Q0063, Date Saved: Mar. 17, 2014, pp. 1-3.

C. Gisquet et al., "AhG10: Palette predictor stuffing", v. 2, JCTVC-Q0063, 17th Meeting: Valencia, ES, Mar. 27-Apr. 4, 2014, pp. 1-6.

* cited by examiner

| A | B | C | A | B | C | A | B | C | A | B | C |
|---|---|---|---|---|---|---|---|---|---|---|---|
| 126 | 165 | 60 | 1 | 101 | 205 | 2 | 104 | 203 | 1 | 103 | 205 |
| 234 | 97 | 62 | 127 | 168 | 60 | 126 | 70 | 205 | 124 | 71 | 203 |
| 236 | 98 | 61 | 234 | 98 | 63 | 124 | 167 | 60 | 123 | 165 | 62 |

| A | B | C | A | B | C | A | B | C | A | B | C |
|---|---|---|---|---|---|---|---|---|---|---|---|
| 125 | 166 | 61 | 0 | 102 | 204 | 0 | 102 | 204 | 0 | 102 | 204 |
| 235 | 97 | 61 | 125 | 166 | 61 | 125 | 71 | 204 | 125 | 71 | 204 |
| 235 | 97 | 61 | 235 | 97 | 61 | 125 | 166 | 61 | 125 | 166 | 61 |

Palette
| I | A | B | C |
|---|---|---|---|
| 0 | 235 | 97 | 61 |
| 1 | 125 | 166 | 61 |
| 2 | 125 | 71 | 204 |
| 3 | 0 | 102 | 204 |
FIG. 7A
| 235, 97, 61 | 125,166, 61 | 125, 71,204 | 0,102,204 |
FIG. 7B
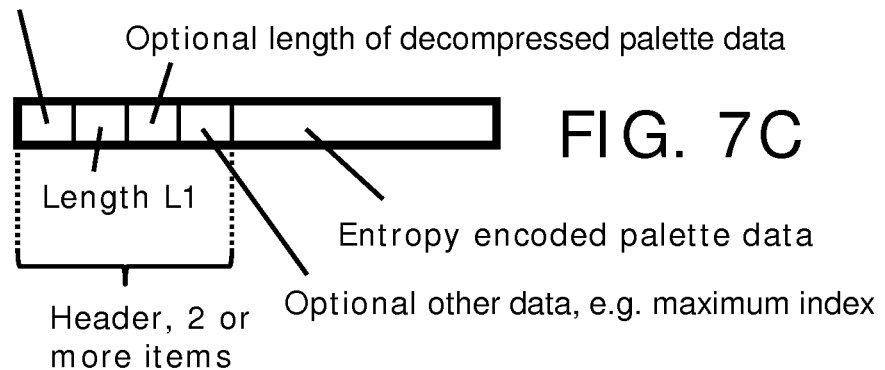
FIG. 7C
Entropy encoding method
Optional length of decompressed palette data
Length L1
Header, 2 or more items
Entropy encoded palette data
Optional other data, e.g. maximum index
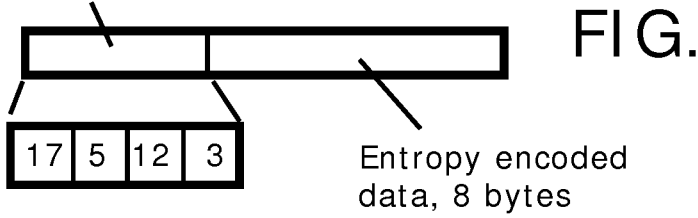
FIG. 7D
Header, 4 bytes
Entropy encoded data, 8 bytes

| 1 | 3 | 3 | 3 |
|---|---|---|---|
| 0 | 1 | 2 | 2 |
| 0 | 0 | 1 | 1 |

FIG. 8A

| 1 | 3 | 3 | 3 | 0 | 1 | 2 | 2 | 0 | 0 | 1 | 1 |
|---|---|---|---|---|---|---|---|---|---|---|---|
| 01 | 11 | 11 | 11 | 00 | 01 | 10 | 10 | 00 | 00 | 01 | 01 |

FIG. 8B

| 127 | 26 | 5 |
|---|---|---|
| 01111111 | 00011010 | 00000101 |

FIG. 8C

ENCODER, DECODER AND METHOD EMPLOYING PALETTE COMPRESSION

CROSS-REFERENCE TO RELATED APPLICATIONS

This application is a National Stage of PCT/EP2016/025064, filed Jun. 20, 2016, which claims priority under 35 U.S.C. § 119 to GB Application No. 1510745.1, filed Jun. 18, 2015, all of which are incorporated herein by reference in their entirety.

TECHNICAL FIELD

The present disclosure relates to encoders for encoding input data (D1) to generate corresponding encoded data (E2), and corresponding methods of encoding input data (D1) to generate corresponding encoded data (E2). Moreover, the present disclosure relates to decoders for decoding encoded data (E2) to generate corresponding decoded data (D3), and corresponding methods of decoding encoded data (E2) to generate corresponding decoded data (D3). Furthermore, the present disclosure is concerned with computer program products comprising a non-transitory computer-readable storage medium having computer-readable instructions stored thereon, the computer-readable instructions being executable by a computerized device comprising processing hardware to execute aforesaid methods. Additionally, the present disclosure concerns codecs including at least one aforementioned encoder and at least one aforementioned decoder.

BACKGROUND

Palettes, also known as "look-up-tables" (LUT's), are conventionally used to describe some sort of information in some other form. As an example, in a conventional Graphics Interchange Format (GIF) file, a color palette is used to describe, for example, 32/64/128/256 different index values that are used to present original information of the GIF file in a lossy or lossless form. Likewise, conventional Portable Network Graphics format (PNG) files also contain palette information.

Each index value in a GIF file describes, for example, 24-bit Blue-Green-Red (BGR) color values, in a manner that some specific combinations of 8-bit color values are used for describing pixel values of the GIF file in red, green and blue channels. If a given color palette includes 256 index values, 768 bytes (=3×256 bytes) are used in a GIF file to describe the given color palette. It is to be noted here that only a limited number of different 24-bit color values can be described by using a limited number of different index values.

Moreover, it is also conventionally possible to use a palette for other purposes. As an example, a color image containing four channels, for example such as RGBA and CMYK, or only one channel, for example such as in a grayscale image or a separate color channel, can be quantized nonlinearly by using a palette. Such a one-dimensional (1-D) palette, also referred to as a 1-D LUT, makes it possible to present data of the image with fewer bits, namely by employing a smaller data range. Therefore, the data is also susceptible to being compressed more efficiently. As described in, for example, Palette (computing)—Wikipedia, the free encyclopedia, (accessed Apr. 29, 2015), URL: http://en.wikipedia.org/wiki/Palette_%28computing %29, incorporated by reference herein in its entirety, presents more detailed background information about color palettes.

It will be appreciated that it is also possible to use a palette for other kinds of data besides images, for example for audio data, video data, measurement data, and so forth. In these cases, a palette (or LUT) employed expresses different types of information other than color values in color pixels. This different type of information includes, for example, an amplitude of an audio signal in a given frequency band; for example, the different type of information describes one or more amplitudes of Fourier harmonic components.

Furthermore, a Color Look-up-Table (CLUT) is often used instead of, or together with, a color palette. A CLUT describes a LUT that enables efficient transformation of used color index values to true colors or vice versa. The CLUT also takes into account a possibility that different true colors are presented with a same color index value, which causes compressed information to be unrecoverable losslessly.

Typically, delivery of a palette uses a large number of bits. As an example, 256 index values for a 32-bit BGRA image require circa 1 kilobytes (=4×256 bytes) for palette delivery, and additionally a few header bytes for describing, for example, a size of palette data and the number of index values in the palette. Especially when a size of an image is small or the number of index values is large, the number of bits used for palette delivery becomes a significant data overhead.

Prior art implementations used in GIF and PNG file formats do not compress their associated palette at all. The GIF and PNG file formats deliver palette entries of a given palette as interleaved data for each palette entry separately. One reason for adopting such an approach is that, typically, the size of image data is large, and the size of the palette data is relatively small as compared to the size of image data. However, there are still many cases where palette data is a significant piece of data.

Conventionally, it is possible to use well-known palettes that are known in advance to a given encoder and a corresponding given decoder. These well-known palettes do not require palette data to be compressed before delivery from the given encoder to the given decoder. Some examples of such well-known color palettes are described in the List of color palettes—Wikipedia, the free encyclopedia, (accessed Apr. 29, 2015), URL: http://en.wikipedia.org/wiki/List_of_color_palettes, incorporated by reference herein in its entirety.

Furthermore, there are known methods that are available for optimizing an order of palette entries in a palette (for example, A Method for Increasing Compression Ratio of Palette Color Images (accessed Apr. 29, 2015), URL: http://www.penguin.cz/~fojtik/palette/palette.htm and IEEE Xplore Abstract—A survey on palette reordering methods for improving the compression of color-indexed images, (accessed Apr. 29, 2015), URL: http://ieeexplore.ieee.org/xpl/login.jsp?tp=&arnumber=1344032&url=http%3A%2F%2Fieeexplore.ieee.org%2Fiel5%2F83%2F29595%2F01344032), incorporated by reference herein in its entirety. However, these methods do not consider compressing the palette itself.

In a published US patent application US 2015/016501 A1, (Liwei GUO et. al; "Palette prediction in palette-based video coding"), incorporated by reference herein in its entirety, there is described a method of coding video data, wherein the method comprising: generating a predictive palette including palette entries that indicate pixel values; determining one or more of the palette entries in the predictive palette that are copied to a current palette for a current block of the video data; determining a number of new palette entries that are included in the current palette for the current block, wherein the new palette entries are not in the predictive palette; calculating a size of the current palette equal to the sum of a number of the copied palette entries and the number of the new palette entries; generating the current palette including the copied palette entries and the new palette entries; and determining index values for one or more pixel values of the current block that identify the palette entries in the current palette used to represent the pixel values of the current block.

In a published document "AHG10: A triplet palette mode combining JCTVC-P0108 and JCTVC-P0198" (Yu-Chen Sun et al.), it is proposed a contribution which proposes a triplet palette mode combining the two proposals, namely JCTVC-P0108 and JCTVC-P0198. The proposed combination is implemented on top of HM-13.0+RExt-6.0. Experimental results reported show that, compared with HM-13.0+RExt-6.0, X.X %, X.X %, and X.X % BD-rate savings are achieved for SC YUV 444 sequences under AI-Main-Tier, RA-Main-Tier, and LB-Main-Tier, respectively.

In a published US patent application US2014/147040 A1 (Tatsuya Tanaka et. al.; "Image encoding device, image decoding device, image encoding method, and image decoding method"), incorporated by reference herein in its entirety, there is described an image encoding device comprising: a deciding unit configured to determine representative colors for expressing each of pixel blocks into which image data are divided; an assigning unit configured to assign an index for identifying the representative color to each pixel in the pixel block; and an encoding unit configured to encode indices and the representative colors, the indices and the representative colors in each pixel box being arranged alternately so that two representative colors are discontinuously encoded.

SUMMARY

The present disclosure seeks to provide an improved encoder for encoding input data (D1) to generate corresponding encoded data (E2).

Moreover, the present disclosure seeks to provide an improved encoder for compressing palette information included within input data (D1), when encoding the input data (D1) to generate corresponding encoded data (E2).

Moreover, the present disclosure seeks to provide an improved decoder for decoding encoded data (E2) to generate corresponding decoded data (D3).

Moreover, the present disclosure seeks to provide an improved decoder for decompressing palette information included within encoded data (E2), when decoding the encoded data (E2) to generate corresponding decoded data (D3).

A further aim of the present disclosure is to at least partially overcome at least some of the problems of the prior art, as discussed above.

In a first aspect, embodiments of the present disclosure provide a method of encoding input data (D1) to generate corresponding encoded data (E2), wherein the method includes encoding the input data (D1) into a plurality of symbols in the encoded data (E2), wherein the plurality of symbols represent data as defined by at least one palette included in the encoded data (E2),
characterized in that the method further includes compressing data representative of each of the at least one palette into corresponding compressed palette data in a lossless manner for inclusion into the encoded data (E2), wherein palette entry values of the at least one palette are provided consecutively within the encoded data (E2).

The present invention is of advantage in that efficient compression of the data representative of the at least one palette provides for improved data compression in the encoded data (E2).

Throughout the present disclosure, the term "palette entry values" indicates a value, or a plurality of values, inside a palette entry of a given palette, wherein the given palette includes at least two palette entries. Notably, a palette entry of a given palette may include one or more values, depending on for example how many channels the given palette has. Moreover, a palette entry may include values from different channels, or several, for example consecutive values from one channel.

By "consecutively", it is meant that the palette entry values are provided as consecutive values, for example concatenated values, without any other values (for example, entry index or data index values) in between. In other words, the palette entry values are included as a coherent chunk of data in the encoded data (E2), namely as consecutive values in the encoded data (E2).

It will be appreciated that the term "at least one palette" encompasses one palette as well as a plurality of palettes. An individual palette is compressed and delivered as one coherent chunk of data, namely at one go, in the encoded data (E2). When there are multiple mutually different palettes, each of these mutually different palettes is compressed one after the other, and the compressed palette data of these mutually different palettes is placed in the encoded data (E2) either consecutively or separately.

Optionally, the method further includes generating the compressed palette data by compressing one channel or mutually different channels of a given palette:
(i) in an interleaved format (namely together);
(ii) in a planar format (namely together or separately); or
(iii) in a format that indicates different palette entry values, for example as a 1-dimensional (1-D) look-up-table (LUT), for each of the mutually different channels, together with availability information indicative of combinations of palette entry values used in the given palette.

Optionally, pursuant to (iii), the availability information is represented by way of at least one of: ordinal numbers of used or unused combinations, bits.

Moreover, when implementing embodiments of the present disclosure, there are potentially employed three mutually different compression methods, namely aforementioned options (i) to (iii), which enable compression of the data representative of the at least one palette (hereinafter referred to as the "palette data" for the sake of convenience only). Compression of palette data is very beneficial when a size of input data (D1) is small, or a size of the palette data is large, namely when there are a large number of palette entries and/or each palette entry contains a large number of values. The aforementioned options (i) to (iii) are, for example, used in combination when processing given data, for mutually different parts of the given data; such a manner of processing data is elucidated in greater detail below.

The aforementioned method can be used in combination with multiple mutually different encoding methods and standards. As an example, the aforementioned method can be used with a data block encoder described in U.S. Pat. No. 8,675,731 B2, incorporated by reference herein in its entirety. As another example, the aforementioned method can be used with the Graphics Interchange Format (GIF), the Portable Network Graphics format (PNG) and the like.

Optionally, the method includes generating the compressed palette data pursuant to aforesaid (i) to (iii) in a format depending upon content and/or data structure present in the input data (D1), during encoding of the input data (D1). Optionally, the three mutually different compression methods are used, either alone or in combination, for mutually different palettes employed for encoding mutually different portions of the input data (D1). In other words, the mutually different portions of the input data (D1) are optionally encoded using at least two mutually different palettes, wherein data representative of the at least two mutually different palettes are optionally compressed using a combination of at least two of aforesaid (i) to (iii). Optionally, all three of (i) to (iii) are used in combination. For example, in an event that the input data (D1) changes therethrough, for example when streamed, from a video conference with medical specialists to providing corresponding lists of DNA genetic sequences to support the video conference, providing at least two mutually different palettes in a dynamically changing format is capable of providing more efficient encoding of the input data (D1).

Optionally, the method includes employing at least one entropy-encoding method to compress the one channel or channels in the interleaved format.

Optionally, the method includes employing at least one entropy-encoding method to compress the one channel or channels together or separately in the planar format.

Optionally, the method includes compressing data of a given channel by using one-dimensional look-up table (1-D LUT) coding.

Optionally, the method includes communicating the plurality of symbols via a communication channel that is different to a communication channel that is employed for communicating the compressed palette data. Alternatively, optionally, the method includes communicating the plurality of symbols via a communication channel that is employed for communicating the compressed palette data.

In a second aspect, embodiments of the present disclosure provide a method of decoding encoded data (E2) to generate corresponding decoded data (D3), wherein the method includes employing at least one palette to decode a plurality of symbols in the encoded data (E2) to generate the decoded data (D3), each of the at least one palette compressed in a lossless manner being included in the encoded data (E2), characterized in that the method further includes decompressing compressed palette data included in the encoded data (E2) to generate the at least one palette, palette entry values of the at least one palette being provided consecutively within the encoded data (E2).

Optionally, in the method, the compressed palette data includes one channel or channels of a given palette that are compressed:
  (i) in an interleaved format (namely together);
  (ii) in a planar format (namely together or separately); or
  (iii) in a format that indicates different palette entry values, for example as a 1-dimensional (1-D) look-up-table (LUT) for each of the channels, together with availability information indicative of combinations of palette entry values used in the given palette.

In a second aspect, embodiments of the present disclosure provide a method of decoding encoded data (E2) to generate corresponding decoded data (D3), wherein the method includes employing at least one palette to decode a plurality of symbols in the encoded data (E2) to generate the decoded data (D3), the at least one palette being included in the encoded data (E2), characterized in that the method further includes decompressing compressed palette data included in the encoded data (E2) to generate the at least one palette, palette entry values of the at least one palette being provided consecutively within the encoded data (E2), wherein the compressed palette data is decompressed in a lossless manner.

Optionally, the method further includes generating the compressed palette data by compressing one channel or channels of a given palette:
  (i) in an interleaved format (namely together);
  (ii) in a planar format (namely together or separately); or
  (iii) in a format that indicates different palette entry values, for example as a 1-dimensional (1-D) look-up-table (LUT), for each of the channels, together with availability information indicative of combinations of palette entry values used in the given palette.

Optionally, pursuant to (iii), the availability information is represented by way of at least one of: ordinal numbers of used or unused combinations, bits.

Optionally, the method includes generating decompressed palette data pursuant to (i) to (iii) in a format during decoding of the encoded data (E2).

Optionally, the method includes employing an inverse of at least one entropy-encoding method employed to decompress the compressed palette data, when the one channel or channels are compressed in the interleaved format.

Optionally, the method includes employing an inverse of at least one entropy-encoding method employed to decompress the compressed palette data, when the one channel or channels are compressed in the planar format.

Optionally, the method includes generating the given palette from the different palette entry values for each of the channels and the availability information indicative of the combinations of palette entry values used in the given palette.

In a third aspect, embodiments of the present disclosure provide an encoder for encoding input data (D1) to generate corresponding encoded data (E2), wherein the encoder is operable to encode the input data (D1) into a plurality of symbols in the encoded data (E2), wherein the plurality of symbols represent data as defined by at least one palette included in the encoded data (E2), characterized in that the encoder is operable to compress data representative of each of the at least one palette into corresponding compressed palette data in a lossless manner for inclusion into the encoded data (E2), wherein palette entry values of the at least one palette are provided consecutively within the encoded data (E2).

Optionally, the encoder is operable to generate the compressed palette data by compressing one channel or channels of a given palette:
  (i) in an interleaved format (namely together);
  (ii) in a planar format (namely together or separately); or
  (iii) in a format that indicates different palette entry values, for example as a 1-dimensional (1-D) look-up-table (LUT), for each of the channels, together with availability information indicative of combinations of palette entry values used in the given palette.

Optionally, pursuant to (iii), the availability information is represented by way of at least one of: ordinal numbers of used or unused combinations, bits.

Optionally, the encoder is operable to generate the compressed palette data pursuant to (i) to (iii) in a format depending upon content and/or data structure present in the input data (D1), during encoding of the input data (D1).

Optionally, the encoder is operable to employ at least one entropy-encoding method to compress the one channel or channels in the interleaved format.

Optionally, the encoder is operable to employ at least one entropy-encoding method to compress the one channel or channels together or separately in the planar format.

Optionally, the encoder is operable to compress data of a given channel by using one-dimensional look-up table (1-D LUT) coding.

Optionally, the encoder is operable to communicate the plurality of symbols via a communication channel to that is different to a communication channel that is employed for communicating the compressed palette data. Alternatively, optionally, the encoder is operable to communicate the plurality of symbols via a communication channel to that is employed for communicating the compressed palette data.

In a fourth aspect, embodiments of the present disclosure provide a decoder for decoding encoded data (E2) to generate corresponding decoded data (D3), wherein the decoder is operable to employ at least one palette to decode a plurality of symbols in the encoded data (E2) to generate the decoded data (D3), each of the at least one palette compressed in a lossless manner being included in the encoded data (E2),
characterized in that the decoder is operable to decompress compressed palette data included in the encoded data (E2) to generate the at least one palette, palette entry values of the at least one palette being provided consecutively within the encoded data (E2).

Optionally, the compressed palette data includes one channel or mutually different channels of a given palette that are compressed:
  (i) in an interleaved format (namely together);
  (ii) in a planar format (namely together or separately); or
  (iii) in a format that indicates different palette entry values, for example as a 1-dimensional (1-D) look-up-table (LUT), for each of the channels, together with availability information indicative of combinations of palette entry values used in the given palette.

Optionally, pursuant to (iii), the availability information is represented by way of at least one of: ordinal numbers of used or unused combinations, bits.

Optionally, the decoder is operable to generate decompressed palette data pursuant to (i) to (iii) in a format during decoding of the encoded data (E2).

Optionally, the decoder is operable to employ an inverse of at least one entropy-encoding method employed to decompress the compressed palette data, when the one channel or channels are compressed in the planar format.

Optionally, the decoder is operable to employ an inverse of at least one entropy-encoding method employed to decompress the compressed palette data, when the one channel or channels are compressed in the planar format.

Optionally, the decoder is operable to generate the given palette from the different palette entry values for each of the channels and the availability information indicative of the combinations of palette entry values used in the given palette.

In a fifth aspect, embodiments of the present disclosure provide a codec including at least one encoder for encoding input data (D1) to generate corresponding encoded data (E2) pursuant to the aforementioned third aspect, and at least one decoder for decoding the encoded data (E2) to generate corresponding decoded data (D3) pursuant to the aforementioned fourth aspect.

In a sixth aspect, embodiments of the present disclosure provide a computer program product comprising a non-transitory computer-readable storage medium having computer-readable instructions stored thereon, the computer-readable instructions being executable by a computerized device comprising processing hardware to execute any of the aforementioned methods pursuant to the aforementioned first or second aspects.

Additional aspects, advantages, features and objects of the present disclosure would be made apparent from the drawings and the detailed description of the illustrative embodiments construed in conjunction with the appended claims that follow.

It will be appreciated that features of the present disclosure are susceptible to being combined in various combinations without departing from the scope of the present disclosure as defined by the appended claims.

BRIEF DESCRIPTION OF THE DRAWINGS

The summary above, as well as the following detailed description of illustrative embodiments, is better understood when read in conjunction with the appended drawings. For the purpose of illustrating the present disclosure, exemplary constructions of the disclosure are shown in the drawings. However, the present disclosure is not limited to specific methods and apparatus disclosed herein. Moreover, those in the art will understand that the drawings are not to scale. Wherever possible, like elements have been indicated by identical numbers.

Embodiments of the present disclosure will now be described, by way of example only, with reference to the following diagrams wherein:

FIGS. 4A, 4B and 4C is a group of illustrations of a data or palette including mutually different channels of the data or palette that are to be compressed in various ways, wherein FIG. 4A is an illustration of an interleaved format, wherein the channels are to be compressed together, in accordance with an embodiment of the present disclosure;

FIG. 4B is an illustration of a planar format, wherein the channels are to be compressed together, in accordance with an embodiment of the present disclosure;

FIG. 4C is an illustration of a planar format, wherein the channels are to be compressed separately, in accordance with an embodiment of the present disclosure;

FIGS. 7A, 7B, 7C and 7D collectively are an illustration of how a three-channel palette is represented, entropy-coded, compressed and inserted into encoded data (E2) and how it is signalled to a corresponding decoder;

FIGS. 8A, 8B and 8C collectively are an illustration of how indices indicative of ordinal numbers of palette entry values can be represented and signalled with few bits;

Figure 1:
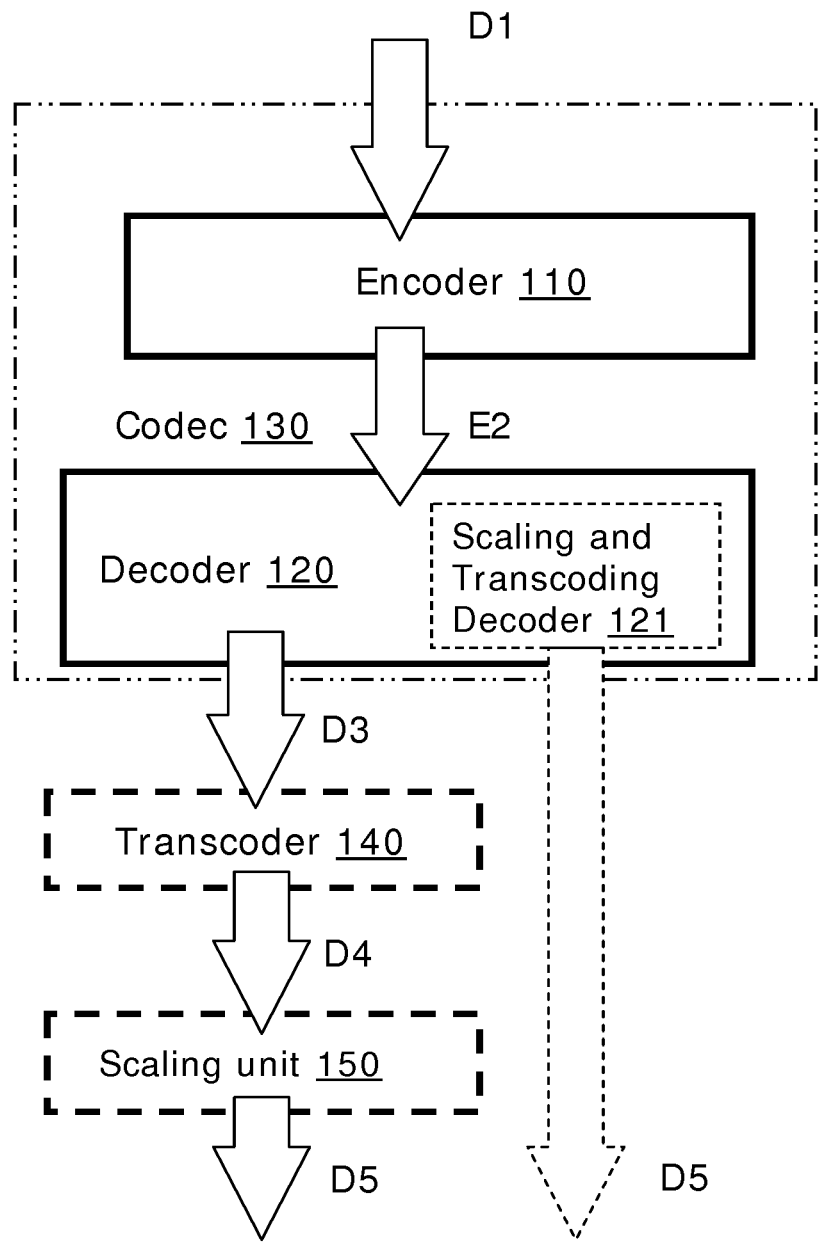
FIG. 1 is a schematic illustration of an encoder for encoding input data (D1) to generate corresponding encoded data (E2) and a decoder for decoding the encoded data (E2) to generate corresponding decoded data (D3), wherein the encoder and the decoder collectively form a codec, in accordance with an embodiment of the present disclosure; optionally, the decoded data (D3) can be either transcoded into transcoded data or scaled or both.

In the accompanying diagrams, an underlined number is employed to represent an item over which the underlined number is positioned or an item to which the underlined number is adjacent. A non-underlined number relates to an item identified by a line linking the non-underlined number to the item.

DETAILED DESCRIPTION OF EMBODIMENTS

The following detailed description illustrates embodiments of the present disclosure and ways in which they can be implemented. Although some modes of carrying out the present disclosure have been disclosed, those skilled in the art would recognize that other embodiments for carrying out or practising the present disclosure are also possible.

In a first aspect, embodiments of the present disclosure provide a method of encoding input data (D1) to generate corresponding encoded data (E2), wherein the method includes encoding the input data (D1) into a plurality of symbols in the encoded data (E2), wherein the plurality of symbols represent data as defined by at least one palette included in the encoded data (E2), characterized in that the method further includes compressing data representative of the at least one palette into compressed palette data in a lossless manner for inclusion into the encoded data (E2), wherein palette entry values of the at least one palette are provided consecutively within the encoded data (E2).

Throughout the present disclosure, the term "palette entry values" indicates a value, or alternatively a plurality of values, inside a palette entry of a given palette, wherein the given palette includes at least two palette entries. Notably, a palette entry of a given palette may include one or more values, depending upon, for example, how many channels the given palette has. Moreover, a palette entry may include values from different channels, or several, for example consecutive, values from one channel.

For a color palette, values inside a palette entry usually include color space values or greyscale values. As an example, in a color palette for the RGB color space, each palette entry includes three bytes that indicate the R, G and B color channels of a pixel. Likewise, the value, or alternatively the plurality of values, inside a palette entry can include bytes indicating any other conceivable data values that indicate one data value combination, or a single data value, that occurs, or could occur, in an original image or other types of data.

By "consecutively", it is meant that the palette entry values are provided as consecutive values, without any other values (for example, entry index or data index values) in between. In other words, the palette entry values are included as a coherent chunk of data in the encoded data (E2), namely as consecutive values in the encoded data (E2).

It will be appreciated that the term "at least one palette" encompasses one palette as well as a plurality of palettes; in other words there may be one palette in one example embodiment, and a plurality of palettes in another example embodiment. An individual palette is compressed and delivered as one coherent chunk of data, namely at one go, in the encoded data (E2). When there are multiple mutually different palettes, each of these mutually different palettes is compressed one after the other, and the compressed palette data of these mutually different palettes is placed in the encoded data (E2) either consecutively or separately. Optionally, when placed consecutively, the compressed palette data of these mutually different palettes are inserted one after the other in the encoded data (E2), such that, when delivered to a corresponding decoder, the compressed palette data of these mutually different palettes are delivered at one go, and are then followed by their associated sections of index data. Alternatively, optionally, when placed separately, the compressed palette data of the mutually different palettes are inserted in the encoded data (E2) in a manner that associated sections of the index data are placed after the compressed palette data of each palette.

Optionally, the method further includes generating the compressed palette data by compressing one channel or mutually different channels of a given palette:
(i) in an interleaved format (namely together);
(ii) in a planar format (namely together or separately); or
(iii) in a format that indicates different palette entry values, for example as a 1-dimensional (1-D) look-up-table (LUT), for each of the mutually different channels, together with availability information indicative of combinations of palette entry values used in the given palette.

In this regard, the palette entry values of the given palette are represented in the interleaved format or in the planar manner or in the format pursuant to (iii).

Optionally, the method includes generating the compressed palette data pursuant to aforesaid (i) to (iii) in a dynamically changing format depending upon content and/or data structure present in the input data (D1), during encoding of the input data (D1); for example, a beginning portion of the input data (D1) is processed using (i), a middle portion of the input data (D1) is processed using (iii) and an end portion of the input data (D1) is processed using (ii). Optionally, the three mutually different compression methods, namely aforementioned options (i) to (iii), are used, either alone or in combination, for mutually different palettes employed for encoding mutually different portions of the input data (D1). In other words, the mutually different portions of the input data (D1) are optionally encoded using at least two mutually different palettes, wherein data representative of the at least two mutually different palettes are optionally compressed using a combination of at least two of aforesaid (i) to (iii). For example, in an event that the input data (D1) changes therethrough, for example when streamed, from a video conference with medical specialists to providing corresponding lists of DNA genetic sequences to support the video conference, providing at least two mutually different palettes in a dynamically changing format is capable of providing more efficient encoding of the input data (D1).

Optionally, the method further includes including within the encoded data (E2) information indicative of a compression method (for example, any of (i) to (iii)) that is selected and employed for compressing the given palette. Optionally, when there are multiple mutually different palettes, information indicative of a compression method employed for each of the multiple mutually different palettes is included within the encoded data (E2).

Throughout the present disclosure, the data representative of the at least one palette includes data of the one channel or mutually different channels of the at least one palette, and is hereinafter interchangeably referred to as the "palette data", for the sake of convenience only.

It will be appreciated that a palette can be used for mutually different types of data, for example, such as image data, video data, audio data, genomic data, measurement data, seismic data, magnetic resonance imaging (MRI) data, deoxyribonucleic acid (DNA) data, ribonucleic acid (RNA) data, biometric data, and so forth. As an example, an audio palette can be used to express an amplitude of an audio signal in a given frequency band. However, it will be appreciated that, contemporarily, color palettes are commonly used for images and represent an example application of embodiments of the present disclosure.

The aforementioned method can be implemented via a given encoder. Optionally, the compressed palette data is delivered from the given encoder to a corresponding given decoder by using one or more data files, or by streaming data from the given encoder to the given decoder. Optionally, the one or more data files can be conveyed via a data carrier, for example, such as an optical disc data memory and/or a solid state data memory.

According to an embodiment of the present disclosure, the method includes communicating the plurality of symbols via a mutually different communication channel to that employed for communicating the compressed palette data. In an example, the compressed palette data is provided as a Universal Serial Bus (USB) dongle for attaching to a personal computer in a form of a physical "access key" for enabling decoding of data to be executed in the personal computer, whereas the plurality of symbols are streamed via a data communication network to the personal computer. Similar considerations pertain to a wireless communication device, wherein the compressed palette data is downloaded in a software application, wherein the software application is used in the wireless communication device to decode a plurality of symbols included in data that is streamed wirelessly to the wireless communication device. Optionally, the software application handles periodic updating of the compressed palette data.

According to another embodiment, the method includes communicating the plurality of symbols via a mutually similar communication channel to that employed for communicating the compressed palette data. Such a scenario pertains, for example, when streaming data to a wireless communication device, for example a smart phone, or to a monitoring arrangement of a seismic geological survey system, or a down-borehole video monitoring system for use in petrochemicals industry.

Moreover, the aforementioned method can be used in combination with multiple mutually different encoding methods and standards. As an example, the aforementioned method can be used with a data block encoder described in U.S. Pat. No. 8,675,731 B2, incorporated by reference herein in its entirety. As another example, the aforementioned method can be used with the Graphics Interchange Format (GIF), the Portable Network Graphics format (PNG) and the like.

According to an embodiment of the present disclosure, when compressing in the interleaved format, the method includes employing at least one entropy-encoding method to compress the one channel or mutually different channels in the interleaved format. In the interleaved format, palette entry values of all the mutually different channels of the given palette are compressed together. Optionally, in this regard, the at least one entropy-encoding method is used to compress palette entry values of the mutually different channels in a sequence in which these palette entry values occur in the interleaved format. As an example, the mutually different channels can be compressed using Huffman coding, Variable-Length Coding (VLC), range coding, or via a reference to a database; an example of such compression of data via a reference to a database is described in a patent application GB2509055A, filed by Gurulogic Microsystems Oy, incorporated by reference herein in its entirety.

It will be appreciated that when only one channel is interleaved, then in practice only that channel is interleaved which in practice is equal to the planar format.

According to an embodiment of the present disclosure, when compressing in the planar format, the method includes employing at least one entropy-encoding method to compress the one channel or mutually different channels together or separately. The term "together" in this context means that the palette entry values of the mutually different channels (namely, planes) are compressed together, whereas the term "separately" means that the palette entry values of the mutually different channels are compressed separately, but are placed consecutively into the encoded data (E2). In other words, the compressed palette data of the given palette is a coherent chunk of data in the encoded data (E2), irrespective of whether the palette entry values of the mutually different channels are compressed together or separately.

As palette entry values of one channel are typically independent of palette entry values of other channels, the mutually different channels can be compressed as planar channels using optionally different entropy-encoding methods. Such a planar format potentially results in a relatively simpler data structure in the encoded data (E2), but also potentially requires less computing effort to implement. In contradistinction, the aforementioned interleaved format is potentially more robust to unauthorized eavesdropping of the encoded data (E2), for example in situations where data security is important. Optionally, encoders and decoders pursuant to the present disclosure are operable to switch dynamically between employing an interleaved format and a planar format when communicating data, for example palette-related data, therethrough.

For a given channel, a suitable entropy-encoding method can be selected based upon an inspection of palette entry values of the given channel. The values thus inspected can be either original symbols or enumerated representations of the original symbols, namely enumerated symbols.

Hereinafter, the term "enumerated symbols" indicates the following: they are a finite set of symbols derived from the original set of symbols; enumerated symbols can be compared for equality and for order. For example, if the original symbol is an alphanumeric character or some other symbol, then that symbol can be converted to a numerical format, for example into ASCII code. In such a case, a palette can be constructed from the numerical ASCII code values (for example, 0=65, 1=68, etc.), In principle, a LUT can also be used for performing the conversion from symbols to corresponding numerical values, namely enumerated symbols, in which case the entries of this same example would be, for example, 0=a, 1=d, etc.

The numerical symbols, namely enumerated symbols, can also, for example, be the result of combinations of values that have a small dynamic range (namely, a small bit depth), or they can be the result of splitting values which have a large dynamic range (namely, a large bit depth). For example, one 6-bit numerical value can always be constructed from three 2-bit symbol values. Correspondingly, two 8-bit numerical values can always be constructed from one 16-bit value.

As an example, if the given channel includes large palette entry values that occur repeatedly, variable length coding (VLC) or range coding can be used to compress the palette entry values of the given channel. As another example, if the given channel includes small palette entry values that occur sequentially, Delta coding or ODelta coding can be used to compress the palette entry values of the given channel. Herein, the term "Delta coding" refers to a method of storing or transmitting data in a form of differences between sequential data rather than complete data files or data values, while the term "ODelta coding" refers to a differential form of encoding based upon wraparound in a binary or integer counting regime, for example as described in the United Kingdom patent document GB 1412937.3.

Moreover, it is also possible to use multiple different entropy-encoding methods one after the other. Optionally, in this regard, the method further includes including within the encoded data (E2) information indicative of one or more entropy-encoding methods and an order in which the one or more entropy-encoding methods are employed during compression of the given palette. Optionally, such information is indicated by one or more pre-defined code words. As an example, a code word "cmODeltaRange" can be used to indicate that the ODelta coding method was employed to entropy code the palette entry values of a given palette, followed by the Range coding method. Correspondingly, the decoder first performs the Range decoding method, followed by the ODelta decoding method. "ODelta" coding methods are described in (1) Palette (computing)—Wikipedia, the free encyclopedia, (accessed Apr. 29, 2015), URL: http://en.wikipedia.org/wiki/Palette%28computing%29; (2) List of color palettes—Wikipedia, the free encyclopedia, (accessed Apr. 29, 2015), URL: http://en.wikipedia.org/wiki/List_of_color_palettes; (3) A Method for Increasing Compression Ratio of Palette Color Images (accessed Apr. 29, 2015), URL: http://www.penguin.cz/~fojtik/palette/palette.htm; (4) IEEE Xplore Abstract—A survey on palette reordering methods for improving the compression of color-indexed images, (accessed Apr. 29, 2015), URL: http://ieeexplore.ieee.org/xpl/login.jsp?tp=&arnumber=1344032&url=http%3A%2F%2Fieeexplore.ieee.org%2Fiel5%2F83%2F29595%2F01344032); (5) U.S. Pat. No. 8,675,731 B2; (6) U.S. Pat. No. 8,754,791 B1; (7) U.S. Patent Publication No. 2014/0044191A1; (8) GB Patent Application No. GB 1222240.2, published as GB2509055A and is also described in detail in various patent applications having Ossi Kalevo named as inventor, and Gurulogic Microsystems Oy named as applicant, all of which are incorporated by reference in their entirety.

This piece of information can be inserted separately or combined with, for example, the aforementioned information indicative of the compression method selected and employed for compressing the given palette. As an example, a code word "emRange" can be used to indicate that Range coding was employed to entropy code the palette entry values of a given palette, wherein "em" stands for entropy encoding method, while a code word "pcmInterleaved" can be used to indicate that the palette entry values of the given palette were compressed in the interleaved format, wherein "pcm" stands for palette compression method. As another example, a combined code word "mInterleavedRange" can be used to indicate that the palette entry values are compressed in the interleaved format using Range coding, wherein "m" stands for methods, namely both the palette compression method and the entropy encoding method.

Moreover, optionally, the method includes compressing data of a given channel by using one-dimensional look-up-table (1-D LUT) coding. More optionally, 1-D LUT coding is employed when compressing in the planar format.

In the 1-D LUT coding, original palette entry values of the given channel are replaced by palette entry values as specified in a 1-D LUT. The 1-D LUT coding is particularly beneficial in a case where the original palette entry values are numbers that are sparsely distributed in the whole dynamic range of the palette entry values, or are not numbers that are replaced by indexing symbols to palette entry index numbers.

Beneficially, the indexes that refer to the ordinal number of palette entries are relatively small, as compared to the original pixel data or other data, or to the value, or values, inside the individual palette entries. It will be appreciated that when the input data (D1) is coded, the indices to the palette entries are referred to. In other words, when the input data (D1) that was encoded using a palette is indicated, then the term "index" refers to the ordinal numbers of the palette entries, and each palette entry is then referred to with an index to that entry during the coding of the data.

Therefore, optionally, Delta or ODelta coding is used to compress the indexes that refer to ordinal number of the palette entries that are used in encoding the original data. Moreover, these index values that are used to point to a 1-D palette can often be compressed very well, for example by employing range coding that re-codes the Delta or ODelta coded index values that refer to ordinal number of the 1D palette entries.

Moreover, optionally, the total number of different index values is reduced when the 1-D LUT coding is used with linear or nonlinear quantization. In this regard, the count of original values or palette entry values is taken into account when optionally quantized and dequantized values for palette entries are defined for a 1-D LUT, so as to reduce, for example to minimize, distortion due to the quantization. When lossy compression is used, it is beneficial to take into account how much distortion will be caused to the original values or original palette entry values when the original palette entry values are replaced with quantized and dequantized versions during reconstruction. As an example, a squared Euclidean distance can be used to represent the distortion caused by lossy compression of palette data, and the compression can then be efficiently optimized by using a Rate Distortion (RD) method, wherein an RD value is calculated as a distortion caused by compression added by "lambda" times a rate required for the compressed palette data and their associated index data (indices that point to the ordinal numbers of the palette entries), wherein "lambda" is a Lagrange multiplier.

Fewer entries will be generated from original data values when the values are quantized than there would be without quantization. It is not intended to quantize the indices to the entries of the palette, because the content of the entries can vary rather arbitrarily from one entry to the other, and thus the indexed data can never be quantized directly. Instead, the values must always in such case be quantized in such a way that, firstly, the index is converted into one or more real values, including the entry, then the gained real values are quantized, and often also de-quantized, and then these new one or more values are matched against the palette entries to find one that best resembles the one or more values. Then, the index of that found entry is used to represent that location in the data.

A quantized entry value in a palette for the 1-D LUT can be one of the original data values, or it can be any other value that lies inside the range of the original palette entry values, for example an average, a weighted average, a median, or a mode of those palette entry values.

According to an embodiment of the present disclosure, the method includes compressing the mutually different channels by delivering different palette entry values, for example as a 1-D LUT, for each channel (hereinafter referred to as "channel data") separately, and delivering availability information indicative of combinations of palette entry values that are used in the given multi-dimensional palette. This is particularly beneficial when the given multi-dimensional palette is large, but each channel contains only a few different palette entry values, namely originally or after quantization or using a 1-D LUT.

When a palette has several values, then those values can be in several channels, or else several values can be in one channel. Therefore, the word 'multi-dimensional' covers a wide range of potential embodiments. That is, it does not limit embodiments to having multiple channels. Such consideration applies to many channels, and therefore, can also be formulated, for example, as "multi-dimensional", in this case a "multi-channel palette".

It will be appreciated that, in a case of 1-D LUT, all the aforementioned palette compression methods are in fact similar, wherein 1-D LUT values are one after another.

It is to be noted that if a multi-channel image is coded, then 1D LUT can be used for one channel, and the other channels can remain in their original state. In such a case, the channels can actually be interleaved, even though 1D LUT was used only for the one channel.

Optionally, the availability information is represented by way of availability bits. Delivering the availability information is particularly beneficial when all possible combinations of the palette entry values are not available in the given palette.

Alternatively, optionally, the availability information is represented by way of the ordinal numbers of the used or unused combination alternatives. Using the ordinal numbers of the used or unused combination alternatives can be beneficial in cases when the palette is fairly small, namely includes only a few palette entries, but fairly many combination alternatives, or when only a small percentage of the combination alternatives remains unused. One reason for there being a lot of combination alternatives may be that there are several channels (namely, the data is multi-dimensional), or that several values out of a channel or out of many channels are inserted into one entry.

It will be appreciated that an order of combinations is also defined, so as to enable a given encoder and a corresponding given decoder to create a similar palette based upon the channel data and the availability information. Optionally, the order of combinations is pre-defined and fixed. Alternatively, optionally, information indicative of the order of combinations is delivered from the given encoder to the corresponding given decoder.

Moreover, optionally, the order of combinations is changed, so as to improve further the compression of the palette data. It is to be noted here that the order of combinations has a large influence on the compression of the input data (D1). Therefore, when the order of combinations is changed, it is beneficial to take into account both a total number of bits required to deliver the encoded data (E2) and a total number of bits required to deliver the compressed palette data.

Moreover, optionally, if amounts of the used and unused combinations are very different, the availability bits can be compressed by employing, for example, range coding with, namely as symbols, or without, namely as bits or symbols, an Entropy Modifying (EM) encoding method that is described in reference [6].

Moreover, it will be appreciated that when different channels of a given palette contain different numbers of mutually different values, the number of different values for each channel is delivered separately. Furthermore, the amount of availability information (for example, bits or ordinal numbers) depends on a multiplication of the number of different data or index values in each channel. Optionally, in this regard, 1-D LUT coding with quantization is particularly beneficial to use. The 1-D LUT coding can be used with quantization to reduce the number of different values to a smaller number. As a result, the number of possible combinations for the channels of the given palette decreases considerably, which, in turn, reduces the amount of availability information (for example, bits or ordinal numbers) required for describing combinations actually used or unused in the given palette.

It will be appreciated that if a palette is compressed using a 1-D LUT, then the palette compression method alternatives, namely interleaved, planar together, planar separately, and the availability bit cases, will be reduced into identical representations where the palette entry values of the palette, namely values of the 1-D LUT, are inserted consecutively. In case of availability bits, the availability bits signal the different value alternatives that are used.

In a second aspect, embodiments of the present disclosure provide a method of decoding encoded data (E2) to generate corresponding decoded data (D3), wherein the method includes employing at least one palette to decode a plurality of symbols in the encoded data (E2) to generate the decoded data (D3), the at least one palette being included in the encoded data (E2), characterized in that the method further includes decompressing compressed palette data included in the encoded data (E2) to generate the at least one palette, palette entry values of the at least one palette being provided consecutively within the encoded data (E2), wherein the compressed palette data is decompressed in a lossless manner.

When a same palette is to be employed for two or more portions of the encoded data (E2), the palette is decompressed during decoding of one of the two or more portions of the encoded data (E2), and is reused for other portion(s) of the two or more portions of the encoded data (E2) that occur later in the order of processing. In such a case, the palette is indicated for the other portion(s), and is not required to be decompressed again.

Optionally, in the method, the compressed palette data includes one channel or mutually different channels of a given palette that are compressed:
(i) in an interleaved format (namely together);
(ii) in a planar format (namely together or separately); or
(iii) in a format that indicates different palette entry values, for example as a 1-dimensional look-up-table (1-D LUT), for each of the mutually different channels, together with availability information indicative of combinations of palette entry values used in the given palette.

Optionally, pursuant to (iii), the availability information is represented by way of at least one of: ordinal numbers of used or unused combinations, bits.

Optionally, the method includes generating decompressed palette data pursuant to (i) to (iii) in a dynamically changing format during decoding of the encoded data (E2).

The aforementioned method can be implemented via a given decoder. The decoder is optionally implemented using digital hardware, or by using a computing device that is suitably configured, for example by executing decoder software products. Optionally, the computing device employs a high-speed reduced instruction set computing (RISC) device, which is well suited for performing at a high speed, in a repetitive manner, relatively simpler types of data processing.

Optionally, the compressed palette data is received via one or more data files, or via streaming from a given encoder to the given decoder. Optionally, the compressed data is provided by using a combination of a physical data carrier and data streaming via a data communication network.

Moreover, the aforementioned method can be used in combination with multiple mutually different decoding methods and standards. As an example, the aforementioned method can be used with a data block decoder described in U.S. Patent Publication No. 2014/0044191 A1, incorporated by reference herein in its entirety. As another example, the aforementioned method can be used with the Graphics Interchange Format (GIF), the Portable Network Graphics format (PNG) and the like.

According to an embodiment of the present disclosure, when the palette data has been compressed in the interleaved format, the method includes employing an inverse of at least one entropy-encoding method that was employed at a given encoder to decompress the compressed palette data. As an example, the compressed palette data can be decompressed using Huffman decoding, variable-length decoding, range decoding, or via a reference to a database; example of data compression performed via a reference to a database is described in a patent application GB2509055A, filed by Gurulogic Microsystems Oy.

It should be noted that the information expressed by a single data value inside a palette entry is always represented inside a known or signalled value range, which means that it always requires a known fixed count of bits to store or deliver that single data value. Correspondingly, the count of entries in a palette is always known or signalled, and therefore a known fixed amount of bits are always required to represent that, too, in the coding of data values.

Of course, palettes can also be compressed, as indeed can the indices that point to the ordinal numbers of the palette entries and that were produced in coding the block. In such a compression process, any conceivable entropy coding method can be used, and thus the compressed result may also contain variable-length symbols. However, the palette itself produces only fixed-length symbols when it is decompressed or when the values are indexed.

According to an embodiment of the present disclosure, when the palette data has been compressed in the planar format, the method includes employing an inverse of at least one entropy-encoding method that was employed at the given encoder to decompress the compressed palette data.

When multiple entropy-encoding methods have been employed at a corresponding encoder, the method of decoding includes employing the inverse of these entropy-encoding methods in a reverse order of processing steps to an order of processing steps employed during encoding of original input data (D1) to generate the encoded data (E2) by the corresponding encoder.

Thus, at a decoder, there is employed a method of decoding encoded data (E2) to generate corresponding decoded data (D3), wherein the method includes employing at least one palette to decode a plurality of symbols in the encoded data (E2) to generate the decoded data (D3), the at least one palette being included in the encoded data (E2); the method further includes decompressing compressed palette data included in the encoded data (E2) to generate the at least one palette, palette entry values of the at least one palette being provided consecutively within the encoded data (E2), wherein the compressed palette data is decompressed in a lossless manner to produce entropy-decoded palette data.

According to an embodiment of the present disclosure, the method includes generating the given palette from the different palette entry values, for example as a 1-D LUT, for each of the mutually different channels and the availability information indicative of the combinations of palette entry values that are used in the given palette. Optionally, in this regard, the method includes receiving information indicative of an order of the combinations from the given encoder.

Next, embodiments of the present disclosure will be described in greater detail.

For illustration purposes only, there will now be provided examples of how a given palette can be compressed pursuant to embodiments of the present disclosure.

In an example, input data (D1) is an interleaved 24-bit RGB image that has symbols as follows:

(i) R(1), G(1), B(1), R(2), G(2), B(2), . . . R(N), G(N), B(N)

or (ii) R(1)G(1)B(1), R(2)G(2)B(2), . . . R(N)G(N)B(N)

Hereinabove, the symbols are 8-bit symbols in (i) and 24-bit symbols in (ii);

'R(N)' denotes an palette entry value of a red color component of an $N^{th}$ pixel;

'G(N)' denotes an palette entry value of a green color component of an $N^{th}$ pixel; and 'B(N)' denotes an palette entry value of a blue color component of an $N^{th}$ pixel.

Optionally, color palettes can be created for each channel separately, namely separately for R, G and B channels of the RGB image. Alternatively, optionally, a single color palette can be created for all channels together.

As an example, for a color palette in the GIF or PNG format, palette data can include 256 RGB palette entries corresponding to 256 24-bit RGB colors, wherein each palette entry is expressed using 24 bits. Without compression, delivery of such a color palette requires 6144 bits (=256×24 bits=768 bytes) to be delivered in addition to a palette header.

In operation, palette data is compressed in a lossless manner pursuant to embodiments of the present disclosure, thereby enabling an efficient delivery of the palette data as compared to conventional methods, where palette data is delivered in an uncompressed manner.

There will now be described below three compression methods that, when used alone or in combination, at least partially overcome at least some of the problems of the prior art, as discussed earlier, namely:

(1) a first compression method, wherein palette data is entropy-encoded in an interleaved format (namely together);

(2) a second compression method, wherein palette data is entropy-encoded in a planar format (namely together or separately); and (3) a third compression method, wherein different palette entry values, for example as a 1-dimensional look-up-table (1-D LUT), for each channel of a palette are indicated, together with availability information indicative of combinations of palette entry values used in a given palette.

Firstly, in respect of embodiments of the present disclosure, entropy-encoding of palette data in an interleaved format will next be described.

Optionally, in this regard, at least one entropy-encoding method is employed to compress the palette data in the interleaved format. As an example, Huffman coding, VLC, range coding or a database (for example, see reference [8] concerning database coding that can be employed) can be used to compress palette entry values of the palette data as they occur in the interleaved format.

For illustration purposes only, there will now be considered an example of a two-channel palette that includes 11 symbols having 22 palette entry values as follows:

(2, 10), (4, 20), (6, 10), (8, 20), (10, 10), (10, 20), (11, 20), (12, 10), (13, 20), (14, 10), (20, 20)

Without compression, when each of these 22 palette entry values are represented by five bits, 110 bits are required to be delivered in addition to palette header for palette delivery from a given encoder to a corresponding given decoder. Alternatively, without compression, when each of these 22 palette entry values is represented by eight bits, 176 bits (as are used in, for example, GIF or PNG) are required to be delivered in addition to palette header for palette delivery from a given encoder to a corresponding given decoder.

In the above example, a count of palette entry values '10' and '20' is seven for each, which is much higher than the count of any of remaining palette entry values, namely the palette entry values '2', '4', '6', '8', '11', '12', '13' and '14'. In other words, the palette entry values '10' and '20' are more probable than the remaining palette entry values. Therefore, Variable-Length Coding (VLC) or range coding can be used to compress the example palette in a lossless manner for delivery with a smaller number of bits.

As an example, using VLC, occurrences of the remaining palette entry values can be represented by a VLC bit code '0', while occurrences of the more-probable palette entry values '10' and '20' can be represented by VLC bit codes '10' and '11', respectively. Moreover, each of the remaining palette entry values can be represented using four or five bits. Thus, a total number of bits required for the palette delivery is only 68 or 76 bits, as calculated below:

8×(1+4 or 5)+(7+7)×2 bits=68 or 76 bits

Moreover, a VLC table is also required to be delivered from the given encoder to the given decoder, but it requires fewer than 42 or 34 bits. As a result, at least some compression benefits are achieved when the example palette is encoded using VLC.

Secondly, in respect of embodiments of the present disclosure, encoding of palette data in a planar format will next be described.

In this regard, each channel of a given palette is compressed separately into a planar format.

Continuing from the previous example of the two-channel palette, a first channel of the palette includes 11 palette entry values in a sequence as follows:

2, 4, 6, 8, 10, 10, 11, 12, 13, 14, 20, while a second channel of the palette includes 11 palette entry values in a sequence as follows:

10, 20, 10, 20, 10, 20, 20, 10, 20, 10, 20

The sequence of data of the first channel can be compressed, for example, using Delta coding or range coding. As an example, the first channel can be compressed using Delta coding with a first prediction value of '0' (zero) to yield Delta values as follows:

2, 2, 2, 2, 2, 0, 1, 1, 1, 1, 6

The sequence of data of the second channel can be compressed, for example, using VLC. As an example, using VLC, occurrences of the palette entry values '10' and '20' can be represented by VLC bit codes '0' and '1', respectively.

The Delta values can be delivered using three bits per Delta value, while the VLC bit codes can be delivered using only one bit per VLC bit code. Thus, apart from a VLC table that is required to be delivered from the given encoder to the given decoder, a total number of bits required for the palette delivery in the planar format is only 44 bits, as calculated below:

11×3+11×1 bits=44 bits

Now, the total number of bits required in the planar format is even less than the total number of bits required in the aforementioned interleaved format. Sometimes, the palette entry values in different channels are similar and they can be compressed together in a similar manner in which the entropy coding is employed in the aforementioned interleaved format example. However, an only difference is that the order of palette entry values is now different, and this potentially provides considerable benefits, for example when using Delta coding together with range coding.

Moreover, optionally, data of a given channel can be compressed by using 1-D LUT coding, for example, as will be described in detail below.

When using a 1-D LUT, a total number of different palette entry values can be reduced if lossy compression of the data is employed. In other words, the total number of different palette entry values can be reduced when the 1-D LUT is used with quantization. In this regard, a count of original palette entry values is taken into account when quantized palette entry values are defined for the 1-D LUT, so as to minimize distortion due to the quantization.

For illustration purposes only, there will now be considered an example of how the 1-D LUT coding can be used with quantization pursuant to embodiments of the present disclosure. In the example, a given channel of a given palette includes 12 palette entry values in a sequence as follows:

178, 2, 229, 230, 75, 2, 2, 2, 178, 77, 230, 230

Hereinabove, the given channel includes only six different original symbols, namely the values inside the lossless palette entries '2', '75', '77', '178', '229' and '230' of the given palette. As an example, four quantized and dequantized values inside the palette entries can be defined for these original symbol values or lossless palette entry values s as follows:

a quantized and dequantized palette entry value '2' for the original symbol or lossless palette entry value '2', a quantized and dequantized palette entry value '76' for the original symbol or lossless palette entry values '75' and '77', a quantized and dequantized palette entry value '178' for the original symbol or lossless palette entry value '178', and a quantized and dequantized palette entry value '230' for the original symbol or lossless palette entry values '229' and '230'.

Moreover, a lossy 1-D LUT can be used to map these quantized palette entry values to new index values, for example, as follows:

| Quantized Palette Entry Value | New Index Value |
| --- | --- |
| 2 | 0 |
| 76 | 1 |
| 178 | 2 |
| 230 | 3 |

It is to be noted here that the new index values in the 1-D LUT are not required to be expressed in a specific order. However, often it is beneficial to have the new index values to be expressed in a specific order.

Each of the new index values can be delivered using only two bits, while each of the quantized palette entry values can be delivered using eight bits. Therefore, the lossy 1-D LUT can be delivered from the encoder to the corresponding decoder with only 40 bits, as calculated below:

$$4 \times 2 + 4 \times 8 \text{ bits} = 40 \text{ bits}$$

Delivery of the 1-D LUT can be optimized even more when the new index values are expressed in a specific order. When it is predefined that the new index values are in a specific order, they do not need to be delivered from the encoder to the decoder; in such a case, only the quantized palette entry values are delivered. Optionally, the quantized palette entry values are delivered using delta coding that uses a "0" value as a first prediction value. Those Delta values are then calculated as below:

2, 74, 102, 52

Each of these Delta values can be represented using 7 bits. In other words, only 4×7 bits=28 bits are needed to deliver the described 1-D LUT from the encoder to the decoder. In this manner, the palette entry values of the given palette, whether in their original, quantized or delta-coded form, are provided consecutively at one go, without new index values in between.

It will be appreciated that even though quantization is used in the illustrated example in constructing the palette entry values, which means that coding the input data (D1) will be lossy, the thereby-produced quantized palette is still compressed in a lossless manner. In other words, during the compression of the palette, no new unpredicted errors are generated in the reconstructed data representative of the palette, or in the reconstruction of the indexes that refer to the ordinal numbers of the palette entries.

In the illustrated example, when the lossy 1-D LUT is used for encoding the given channel, the new index values (see the table above) are provided in a sequence as follows:

2, 0, 3, 3, 1, 0, 0, 0, 2, 1, 3, 3

When the original palette entry values of the given channel are delivered without compression, 96 bits (=12×8 bits) are required to be delivered. However, when the new index values are delivered, only 24 bits (=12×2 bits) are required to be delivered in addition to 28 bits for delivering the 1-D LUT.

Furthermore, optionally, Delta or ODelta coding is beneficially used to compress these new index values, as the new index values are relatively small as compared to the original palette entry values. Such Delta or ODelta coding of the new index values potentially reduces a total number of bits required to be delivered for delivering the 1-D LUT, the given palette and the data of the given channel.

Thirdly, in respect of embodiments of the present disclosure, encoding of palette data in a format that indicates different palette entry values, for example as a 1-D LUT, for each channel of a palette, together with availability information, will next be described.

Optionally, in this regard, palette data is compressed by delivering different palette entry values, for example as a 1-D LUT, for each channel (hereinafter referred to as "channel data") separately, and delivering availability information denoting which combinations of palette entry values are used in the palette. This is particularly beneficial when the palette is large, but each channel contains only a few different index values, namely originally or after quantization or using a 1-D LUT.

It will be appreciated that an order of combinations is also defined, so as to enable a given encoder and a corresponding given decoder to create a similar palette based upon the channel data and the availability information.

As an example, if there are three channels in a given palette and eight different index values that are used for each channel, then following are required to be delivered:

(i) eight bits for representing the number of different palette entry values, namely eight in this example, (ii) 64 bits (=8×8 bits) for representing the eight different palette entry values, for example as a 1-D LUT, for each channel separately, and (iii) 512 availability bits (=8×8×8 bits) for representing combinations that are used in the given palette.

If, in this example, there are 256 used and 256 unused combinations, a total number of bits required to deliver these 256 different 24-bit palette entries is 712 bits, as calculated below:

$$8 + 3 \times 64 + 512 = 712 \text{ bits} = 89 \text{ bytes}$$

Thus, the total number of bits required to be delivered for the palette delivery is much less as compared to conventional methods, such as the aforementioned GIF or PNG, namely only 712 bits (89 bytes) are required to be delivered, instead of 6144 bits (768 bytes).

For illustration purposes only, there will now be considered an example of how a given palette can be delivered using availability bits pursuant to embodiments of the present disclosure. In the example, the given palette corresponds to three channels as follows:

(i) a first channel having three palette entry values '0', '1' and '2', (ii) a second channel having four palette entry values '0', '1', '2' and '3', and (iii) a third channel having two palette entry values '0' and '1'.

As a result, there are 24 (=3×4×2) possible combinations of palette entry values for the given palette that can be represented in a following order:

(0, 0, 0), (0, 0, 1), (0, 1, 0), (0, 1, 1), (0, 2, 0), (0, 2, 1), (0, 3, 0), (0, 3, 1), (1, 0, 0), (1, 0, 1), (1, 1, 0), (1, 1, 1), (1, 2, 0), (1, 2, 1), (1, 3, 0), (1, 3, 1), (2, 0, 0), (2, 0, 1), (2, 1, 0), (2, 1, 1), (2, 2, 0), (2, 2, 1), (2, 3, 0), (2, 3, 1)

As an example, the availability bits are used to represent used and unused combinations as follows:

11110111 11101111 11011110

From the availability bits, it is determined at a given decoder that there are 20 used combinations and 4 unused combinations. In other words, the combinations (0, 2, 0), (1, 1, 1), (2, 1, 0), and (2, 3, 1) are not used in the given palette. The remaining combinations, namely the used combinations, can then be indicated with new index values, for example from '0' to '19' in the same order. However, it is not required to deliver the new index values from a given encoder to a given decoder, if the new index values are assigned in a specific order. In such a case, the new index values can be known implicitly. In other words, palette entries of a given palette are signaled in a specific order, and therefore, there is no need to signal the values of the indices to the palette entries, namely their ordinal numbers, when the palette is compressed and signaled.

In this example, the total number of bits required to be delivered for the palette delivery is only 120 bits, as calculated below:

$$3\times 8+(3+4+2)\times 8+24 \text{ bits}=120 \text{ bits},$$

wherein eight bits are required for delivering the number of different palette entry values for each of the three channels, 72 bits are required for delivering the different palette entry values, and 24 bits are needed for availability bits.

Thus, only 120 bits are required to be delivered, instead of delivering 480 bits (=20×24 bits) for the 20 used combinations of the given palette. Alternatively, in this example, instead of the 24 availability bits, it is also possible to deliver the ordinal numbers of the four combination alternatives that do not occur in the palette. That is, the ordinal numbers 4, 11, 18 and 23 do not occur in the palette, and it would require 20 bits (=4×5 bits) to signal them. Five bits are sufficient to represent one individual alternative from amongst the 24 different ordinal number alternatives.

Optionally, these ordinal numbers can even be delta-coded at this point, but it would not yield any additional advantages in this example case. The information delivery mechanism is either known, or else information about the selected method needs to be inserted into the encoded data (E2), as described earlier.

Moreover, optionally, the total number of bits can be further reduced by at least one of:
(i) employing a suitable entropy-encoding method based upon an inspection of real dynamics, namely a data range of the index values, for example such as Delta coding, and/or
(ii) using range coding, with or without entropy modification (EM), for the availability bits.

It is evident that the three compression methods described in the foregoing, when used alone or in combination, improve the palette delivery from a given encoder to a corresponding given decoder. These compression methods, either alone or in combination, are beneficially used, for example, when a size of input data (D1) is small, or a size of the palette data is large.

Pursuant to embodiments of the present disclosure, at least two of the three compression methods are optionally used together, so as to further improve the palette delivery from the given encoder to the corresponding given decoder. As an example, channel data generated by the third compression method can be delivered using Delta coding.

Moreover, it will be appreciated that, in the third compression method, when different channels of a given palette contain different numbers of mutually different palette entry values, the number of different palette entry values, for example as a 1-D LUT, for each channel is delivered together or separately. Moreover, the number of availability bits depends on a multiplication of the number of different palette entry values in each channel. Optionally, in this regard, 1-D LUT coding with quantization is particularly beneficial to use with the third compression method. The 1-D LUT coding can be used with quantization to reduce the number of different palette entry values to a smaller number. As a result, the number of possible combinations for the channels of the given palette decreases considerably, which, in turn, reduces the number of availability bits required for describing combinations actually used in the given palette.

In a third aspect, embodiments of the present disclosure provide an encoder for encoding input data (D1) to generate corresponding encoded data (E2), wherein the encoder is operable to encode the input data (D1) into a plurality of symbols in the encoded data (E2), wherein the plurality of symbols represent data as defined by at least one palette included in the encoded data (E2), characterized in that the encoder is operable to compress data representative of the at least one palette into compressed palette data in a lossless manner for inclusion into the encoded data (E2), wherein palette entry values of the at least one palette are provided consecutively within the encoded data (E2).

Optionally, the encoder is operable to generate the compressed palette data by compressing one channel or mutually different channels of a given palette:
(i) in an interleaved format (namely together);
(ii) in a planar format (namely together or separately); or
(iii) in a format that indicates different palette entry values, for example as a 1-dimensional look-up-table (1-D LUT), for each of the mutually different channels, together with availability information indicative of combinations of palette entry values used in the given palette.

Optionally, the encoder is operable to generate the compressed palette data pursuant to (i) to (iii) in a dynamically changing format depending upon content and/or data structure present in the input data (D1), during encoding of the input data (D1).

Optionally, the encoder is operable to deliver the compressed palette data to a corresponding given decoder by using one or more data files, or by streaming data to the given decoder. In an example, a combination of physical data memory and data streaming is employed when delivering the encoded data (E2). The physical data memory is provided, for example, as a USB dongle for a personal computer, namely in a form of a physical "access key" to enable the personal computer to decode the encoded data (E2).

According to an embodiment of the present disclosure, the encoder is operable to communicate the plurality of symbols via a mutually different communication channel to that employed for communicating the compressed palette data.

According to another embodiment of the present disclosure, the encoder is operable to communicate the plurality of symbols via a mutually similar communication channel to that employed for communicating the compressed palette data.

Moreover, the aforementioned encoder can be used together with multiple mutually different encoders. As an example, the aforementioned encoder can be used with a data block encoder described in U.S. Pat. No. 8,675,731 B2, incorporated by reference herein in its entirety. As another example, the aforementioned encoder can be used with the Graphics Interchange Format (GIF), the Portable Network Graphics format (PNG) and the like.

According to an embodiment of the present disclosure, when compressing in the interleaved format, the encoder is operable to employ at least one entropy-encoding method to compress the one channel or mutually different channels in the interleaved format. Optionally, in this regard, the encoder is operable to use the at least one entropy-encoding method to compress index values of the mutually different channels in a sequence in which these index values occur in the interleaved format. As an example, the encoder is operable to compress the mutually different channels using Huffman coding, Variable-Length Coding (VLC), range coding, or via a reference to a database, for example as described in a patent application GB2509055A, filed by Gurulogic Microsystems Oy, incorporated by reference herein in its entirety.

According to an embodiment of the present disclosure, when compressing in the planar format, the encoder is operable to employ at least one entropy-encoding method to compress the one channel or mutually different channels together or separately, as described earlier.

Moreover, optionally, the encoder is operable to compress data of a given channel by using 1-D LUT coding, as described earlier. More optionally, such 1-D LUT coding is employed when compressing in the planar format.

According to an embodiment of the present disclosure, the encoder is operable to compress the palette data by delivering different palette entry values, for example as a 1-D LUT, for each channel separately, and delivering availability information indicative of combinations of palette entry values that are used in the given palette. This is particularly beneficial when the given palette is large, but each channel contains only a few different palette entry values, namely originally or after quantization or using a 1-D LUT.

Optionally, the availability information is represented by way of availability bits. Delivering the availability information is particularly beneficial when all possible combinations of the palette entry values are not available in the given palette.

Alternatively, optionally, the availability information is represented by way of ordinal numbers of the used or unused combinations.

It will be appreciated that an order of combinations is also defined, so as to enable the encoder and a corresponding decoder to create a similar palette based upon the channel data and the availability information, for example availability bits. Optionally, the order of combinations is pre-defined and fixed. Alternatively, optionally, information indicative of the order of combinations is delivered from the encoder to the corresponding decoder.

In a fourth aspect, embodiments of the present disclosure provide a decoder for decoding encoded data (E2) to generate corresponding decoded data (D3), wherein the decoder is operable to employ at least one palette to decode a plurality of symbols in the encoded data (E2) to generate the decoded data (D3), the at least one palette being included in the encoded data (E2),
characterized in that the decoder is operable to decompress compressed palette data included in the encoded data (E2) to generate the at least one palette, palette entry values of the at least one palette being provided consecutively within the encoded data (E2), wherein the compressed palette data is decompressed in a lossless manner.

Optionally, the compressed palette data includes one channel or mutually different channels of a given palette that are compressed:
  (i) in an interleaved format (namely together);
  (ii) in a planar format (namely together or separately); or
  (iii) in a format that indicates different palette entry values, for example as a 1-dimensional look-up-table (1-D LUT), for each of the mutually different channels, together with availability information indicative of combinations of palette entry values used in the given palette.

Optionally, pursuant to (iii), the availability information is represented by way of at least one of: ordinal numbers of used or unused combinations, bits.

Optionally, the decoder is operable to generate decompressed palette data pursuant to (i) to (iii) in a dynamically changing format during decoding of the encoded data (E2).

Optionally, the decoder is operable to receive the compressed palette data via one or more data files, or via streaming from a given encoder.

Moreover, the aforementioned decoder can be used together with multiple mutually different decoders. As an example, the aforementioned decoder can be used with a data block decoder described in U.S. Patent Publication No. 2014/0044191 A1, incorporated by reference herein in its entirety. As another example, the aforementioned decoder can be used with the Graphics Interchange Format (GIF), the Portable Network Graphics format (PNG) and the like.

According to an embodiment of the present disclosure, when the palette data has been compressed in the interleaved format, the decoder is operable to employ an inverse of at least one entropy-encoding method that was employed at a given encoder to decompress the compressed palette data. As an example, the decoder is operable to decompress the compressed palette data using Huffman decoding, variable-length decoding, range decoding, or via a reference to a database, for example as described in a patent application GB2509055A, filed by Gurulogic Microsystems Oy, incorporated by reference herein in its entirety.

According to an embodiment of the present disclosure, when the palette data has been compressed in the planar format, the decoder is operable to employ an inverse of at least one entropy-encoding method that was employed at the given encoder to decompress the compressed palette data.

When multiple entropy-encoding methods have been employed at a corresponding encoder, the decoder is operable to employ the inverse of these entropy-encoding methods in a reverse order of processing steps to an order of processing steps employed during encoding of original input data (D1) to generate the encoded data (E2) by the corresponding encoder.

Thus, at a decoder, there is employed a method of decoding encoded data (E2) to generate corresponding decoded data (D3), wherein the method includes employing at least one palette to decode a plurality of symbols in the encoded data (E2) to generate the decoded data (D3), the at least one palette being included in the encoded data (E2); the method further includes decompressing compressed palette data included in the encoded data (E2) to generate the at least one palette, palette entry values of the at least one palette being provided consecutively within the encoded data (E2), wherein the compressed palette data is decompressed in a lossless manner to produce entropy-decoded palette data.

According to an embodiment of the present disclosure, the decoder is operable to generate the given palette from the different palette entry values, for example as a 1-D LUT, for each of the mutually different channels and the availability information indicative of the combinations of palette entry values that are used in the given palette. Optionally, in this regard, the decoder is operable to receive information indicative of an order of the combinations from the given encoder.

In a fifth aspect, embodiments of the present disclosure provide a codec including at least one encoder for encoding input data (D1) to generate corresponding encoded data (E2) pursuant to the aforementioned third aspect, and at least one decoder for decoding the encoded data (E2) to generate corresponding decoded data (D3) pursuant to the aforementioned fourth aspect. Such a codec is, for example, employed in scientific instruments for sensing a given region, for generating the input data (D1), for encoding the input data (D1) to generate corresponding encoded data (E2), for example for storage in data memory of the scientific instruments, and for providing review of the encoded data (E2), for example replay of the encoded data (E2), spatially locally at the scientific instruments. The scientific instruments include, for example medical ultrasonic sensing apparatus, MRI imagers, endoscopic inspection devices, dental X-ray (Röntgen) apparatus, and so forth, but not limited thereto.

An example codec has been provided in conjunction with FIG. 1 as explained in more detail below. The codec includes at least one encoder and at least one decoder.

The at least one encoder employs a method of encoding input data (D1) as described in the foregoing including compression of palette data. The at least one encoder is thus operable to encode the input data (D1) to generate corresponding encoded data (E2).

Moreover, the at least one decoder is operable to perform an inverse of operations executed in the at least one encoder, to decode the encoded data (E2) to generate corresponding decoded data (D3).

Optionally, the decoded data (D3) is identical to the input data (D1), as in a lossless mode of operation. Alternatively, optionally, the decoded data (D3) is substantially similar to the input data (D1), as in a lossy mode of operation; optionally, "substantially similar" means at least 80% similar, more optionally 90% similar, and yet more optionally, at least 99% similar; such similarity is computed by a percentage of the number of bits that are similar, to a total number of bits being compared for assessing similarity. Yet alternatively, optionally, the decoded data (D3) is different to the input data (D1), for example by way of transcoding or via use of one or more transformations, for example, such as a color conversion, a format conversion, an upscaling conversion, a downscaling conversion, a cropping conversion, a rotation conversion, a flipping conversion but not limited thereto, but retains substantially similar information present in the input data (D1); for example, the decoded data (D3) is usefully made different to the input data (D1) when reformatting of the decoded data (D3) is also required, for example to be compatible with different types of communication platforms, software layers, communication devices, display devices and so forth.

A color conversion can be deemed to be optimal for following reasons:
(i) it is able to achieve as good a reconstruction as is possible; and/or
(ii) it is able to execute the optimal color conversion as regards, for example, properties of a display device to be used for presenting the decoded data (D3).

However, an essential issue is the following: if a palette exists that contains values, for example in the RGB color space, and it is desired to reconstruct an image in the YUV color space, then it is considerably more efficient firstly to transform the palette values from the RGB color space to the YUV color space and then to map those YUV values from the transformed palette, than it would be if the values were firstly mapped from the original RGB palette and then a thereby generated image were transformed into the YUV color space. It will be appreciated that the amount of necessary operations is considerably smaller in the first option here.

The at least one encoder includes a data processing arrangement for processing the input data (D1) to generate the corresponding encoded data (E2) pursuant to embodiments of the present disclosure. Optionally, the data processing arrangement of the at least one encoder is implemented by employing at least one Reduced Instruction Set Computing (RISC) processor that is operable to execute program instructions as elucidated earlier. RISC processors are operable, for example, to implement relatively simple data manipulations at a very great speed, whilst simultaneously utilizing relatively little electrical power, namely a characteristic that is highly advantageous when embodiments of the present disclosure are implemented in mobile battery-powered apparatus, for example "black box" flight recorders for aircraft.

Furthermore, optionally, the at least one encoder is operable to communicate the encoded data (E2) to a data server and/or data storage for storing in a database. The data server and/or data storage is arranged to be accessible to the at least one decoder, which is beneficially compatible with the at least one encoder, for subsequently decoding the encoded data (E2).

In some examples, the at least one decoder is optionally operable to access the encoded data (E2) from the data server and/or data storage.

In alternative examples, the at least one encoder is optionally operable to stream the encoded data (E2) to the at least one decoder, either via a data carrier or a data communication network or via a direct connection. Moreover, it is to be noted that a device equipped with a hardware-based or software-based encoder can also communicate directly with another device equipped with a hardware-based or software-based decoder.

In yet other alternative examples, the at least one decoder is optionally implemented so as to retrieve the encoded data (E2) from a non-transitory (namely non-transient) computer-readable storage medium, such as a hard drive and a Solid-State Drive (SSD).

The at least one decoder includes a data processing arrangement for processing the encoded data (E2) to generate the corresponding decoded data (D3) pursuant to embodiments of the present disclosure. Optionally, the data processing arrangement of the at least one decoder is implemented by employing at least one RISC processor that is operable to execute program instructions as elucidated earlier; such a RISC processor is capable of performing relatively simpler concatenated operations at a very high speed, and is suitable for decoding data provided in a streamed format, for example in real-time. RISC processors are contemporarily employed in smart phones for performing data processing of heterodyned wireless signals at high speed, and enable embodiments of the present disclosure to be conveniently implemented on such smart phones, for example.

When embodiments of the present disclosure are implemented in a multicasting manner, there is a plurality of such decoders that are employed.

Optionally, the codec is implemented within a single device. Alternatively, optionally, the codec is effectively implemented between multiple devices. Optionally, the codec is implemented as custom-designed digital hardware, for example via use of one or more Application-Specific Integrated Circuits (ASIC's). Alternatively or additionally, optionally, the codec is implemented using computing hardware that is operable to execute program instructions, for example provided to the computing hardware on a non-transient (non-transitory) machine-readable data carrier.

As an example, the at least one encoder and/or the at least one decoder can be beneficially employed in consumer electronics apparatus, wireless communication apparatus and associated systems, cameras, smart phones, tablet computers, personal computers, scientific measuring apparatus, flight recorders, communications equipments, display devices, videoconferencing equipments, satellites, but not limited thereto.

In a sixth aspect, embodiments of the present disclosure provide a computer program product comprising a non-transitory computer-readable storage medium having computer-readable instructions stored thereon, the computer-readable instructions being executable by a computerized device comprising processing hardware to execute any of the aforementioned methods pursuant to the aforementioned first or second aspects.

Optionally, the computer-readable instructions are downloadable from a software application store, for example, from an "App store" to the computerized device, for example to a smart phone.

Next, embodiments of the present disclosure will be described with reference to figures.

Referring to FIG. 1, embodiments of the present disclosure concern:
  (i) an encoder 110 for encoding input data (D1) to generate corresponding encoded data (E2), and corresponding methods of encoding the input data (D1) to generate the encoded data (E2);
  (ii) a decoder 120 for decoding the encoded data (E2) to generate corresponding decoded data (D3), and corresponding methods of decoding the encoded data (E2) to generate the decoded data (D3); and
  (iii) a codec 130 including a combination of at least one encoder and at least one decoder, for example a combination of the encoder 110 and the decoder 120.

Optionally, the decoded data (D3) is subjected to a transcoder 140 to produce transcoded decoded data (D4).

Additionally, optionally, the decoded data (D3) or the transcoded data (D4) is subjected to a scaling unit 150 to produce decoded, transcoded and scaled data (D5).

Optionally, the encoded data (E2) can be subjected to a Scaling and Transcoding Decoder 121 included in the decoder 120 to produce decoded data; or decoded and scaled data; or decoded and transcoded data (D4); or decoded, transcoded and scaled data (D5).

A left side of FIG. 1 presents an execution path wherein the encoded data (E2) is decoded by the decoder (120) into the decoded data (D3), which is either delivered further as such, or, optionally, firstly transcoded into new transcoded data (D4), which can be delivered further as such. However, this transcoded data (D4) can optionally be scaled into new transcoded and scaled data (D5). It will be appreciated that the order of the scaling and transcoding procedures can be swapped freely. Moreover, the decoded data (D3) can be scaled only or transcoded only.

A right side of FIG. 1 presents an alternative execution path wherein the encoded data (E2) is fed to a combined scaling and transcoding decoder 121, which is capable of decoding, transcoding and scaling when necessary. The scaling and transcoding decoder 121 either only decodes the encoded data (E2), or it decodes the encoded data (E2) and transcodes and/or scales the decoded data into new data (D5), which can be either only decoded, decoded and transcoded, decoded and scaled, or decoded, transcoded, and scaled.

FIG. 1 is merely an example, which does not unduly limit the scope of the claims herein. It is to be understood that the specific designation for the codec 130 is provided as an example and is not to be construed as limiting the codec 130 to specific numbers, types, or arrangements of encoders and decoders. A person skilled in the art will recognize many variations, alternatives, and modifications of embodiments of the present disclosure.

Figure 2:
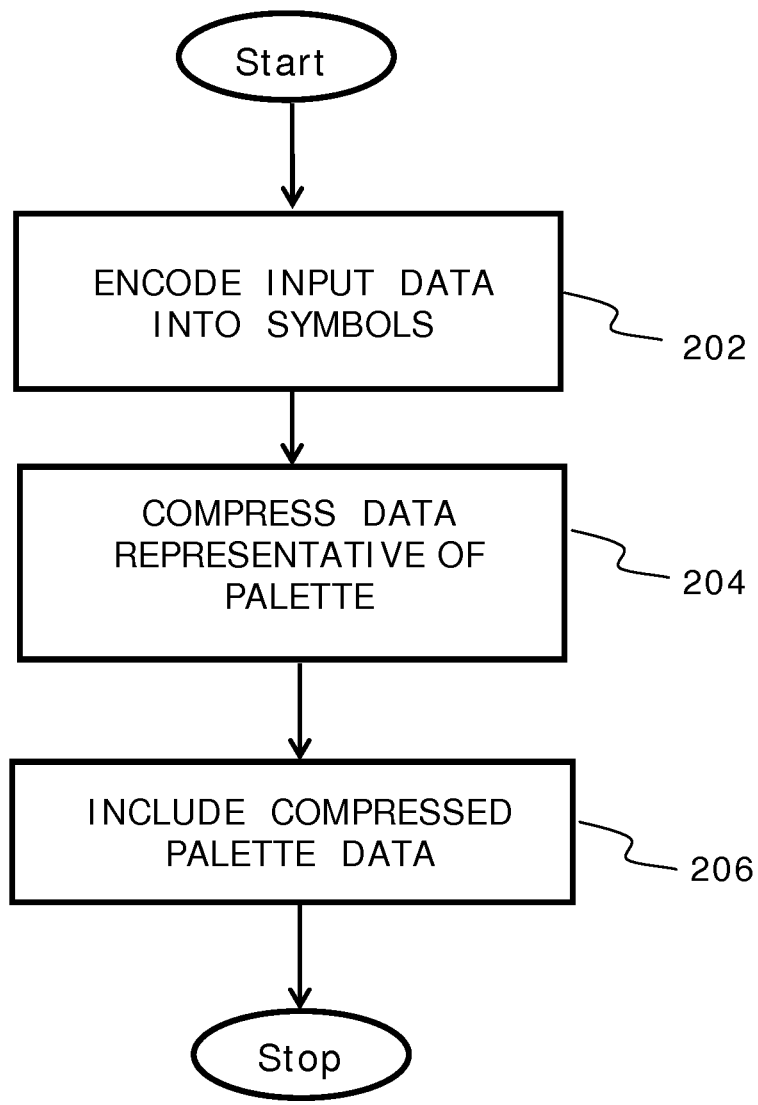
FIG. 2 is a schematic illustration of a flow chart depicting steps of a method of encoding input data (D1) to generate corresponding encoded data (E2), in accordance with an embodiment of the present disclosure.

Referring now to FIG. 2, there is provided a flow chart depicting steps of a method of encoding input data (D1) to generate corresponding encoded data (E2), in accordance with an embodiment of the present disclosure. The method is depicted as a collection of steps in a logical flow diagram, which represents a sequence of steps that can be implemented in hardware, software, or a combination thereof, for example as aforementioned.

At a step 202, the input data (D1) is encoded into a plurality of symbols in the encoded data (E2), wherein the plurality of symbols represent data as defined by at least one palette.

At a step 204, data representative of the at least one palette is compressed into compressed palette data in a lossless manner. Optionally, in accordance with the step 204, one channel or mutually different channels of a given palette are compressed:
  (i) in an interleaved format (namely together);
  (ii) in a planar format (namely together or separately); or
  (iii) in a format that indicates different palette entry values, for example as a 1-dimensional look-up-table (1-D LUT), for each of the mutually different channels, together with availability information indicative of combinations of palette entry values used in the given palette.

Any combination of (i) to (iii) are potentially employed, for example in a dynamically changing manner as given input data (D1) is being encoded to generate the encoded data (E2), mutatis mutandis in a dynamically changing manner in a corresponding decoder.

At a step 206, the compressed palette data is included in the encoded data (E2) in a manner that palette entry values of the at least one palette are provided consecutively within the encoded data (E2).

The steps 202 to 206 are only illustrative and other alternatives can also be provided where one or more steps are added, one or more steps are removed, or one or more steps are provided in a different sequence without departing from the scope of the claims herein.

Figure 3:
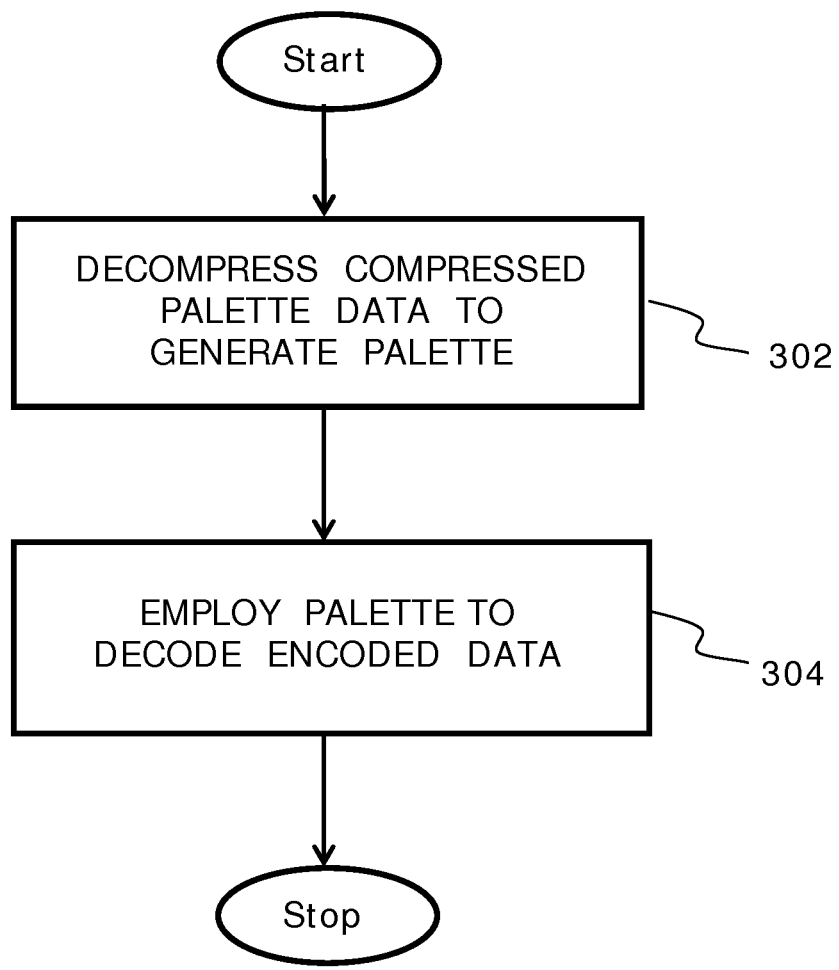
FIG. 3 is a schematic illustration of a flow chart depicting steps of a method of decoding encoded data (E2) to generate corresponding decoded data (D3), in accordance with an embodiment of the present disclosure.

Referring now to FIG. 3, there is provided a flow chart depicting steps of a method of decoding encoded data (E2) to generate corresponding decoded data (D3), in accordance with an embodiment of the present disclosure. The method is depicted as a collection of steps in a logical flow diagram, which represents a sequence of steps that can be implemented in hardware, software, or a combination thereof, for example as aforementioned.

At a step 302, compressed palette data included in the encoded data (E2) is decompressed to generate at least one palette, wherein palette entry values of the at least one palette are provided consecutively within the encoded data (E2). In accordance with the step 302, the compressed palette data is decompressed in a lossless manner.

Optionally, the compressed palette data includes one channel or mutually different channels of a given palette that are compressed:
  (i) in an interleaved format (namely together);
  (ii) in a planar format (namely together or separately); or
  (iii) in a format that indicates different palette entry values, for example as a 1-dimensional look-up-table (1-D LUT), for each of the mutually different channels, together with availability information indicative of combinations of palette entry values used in the given palette.

At a step 304, the at least one palette is employed to decode a plurality of symbols in the encoded data (E2) to generate the decoded data (D3).

The steps 302 to 304 are only illustrative and other alternatives can also be provided where one or more steps are added, one or more steps are removed, or one or more steps are provided in a different sequence without departing from the scope of the claims herein.

Figure 4A:
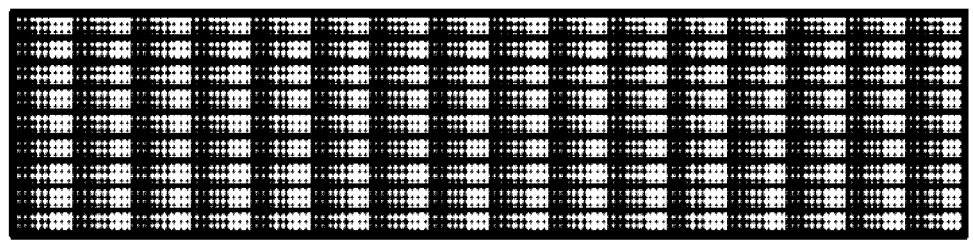

Referring next to FIG. 4A, there is shown an illustration of example data or palette expressed via use of channels A, B and C in an interleaved format, wherein the data or the palette associated with the channels A, B and C are to be compressed mutually together, in accordance with an embodiment of the present disclosure. Moreover, in FIG. 4B, there is shown an illustration of example data or palette expressed via use of channels A, B and C in a planar format, wherein the data or the palette associated with the channels A, B, and C are to be compressed mutually together, in accordance with an embodiment of the present disclosure. Furthermore, in FIG. 4C, there is shown an illustration of example data or palette, wherein the data or the palette associated with the channels A, B and C are in a planar format and are to be compressed mutually separately, in accordance with an embodiment of the present disclosure. The example data represents, for example, image data, audio data, sensor data, genetic data, but not limited thereto.

Figure 5:
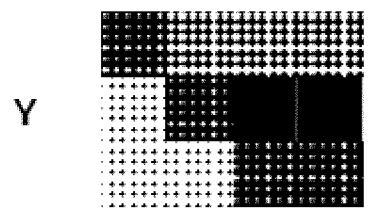
FIG. 5 is an illustration of data that is modified with 1-dimensional (1-D) look-up-table (LUT) for compression, in accordance with an embodiment of the present disclosure.

Referring next to FIG. 5, data denoted by "Y" is, for example, color-defining data associated with one or more images. When expressed in a planar format, the data "Y" has palette entry values, which are integer values, as shown, in a range of 71 to 166. The palette entry values are expressible in a 1-dimensional look-up-table (1-D LUT), having values 71, 97, 102 and 166, which are referenced by index values 0, 1, 2 and 3, respectively. As the palette entry values are delivered in a specific order, the index values 0, 1, 2 and 3 are not required to be delivered from an encoder to a corresponding decoder, and are known implicitly.

Using the index values during encoding of the images, the color-defining values can also be defined efficiently in a planar format, by using fewer bits, with reference to the 1-D LUT. There is thereby provided an efficient method of encoding the data denoted by "Y", in accordance with an embodiment of the present disclosure.

Figure 6A:
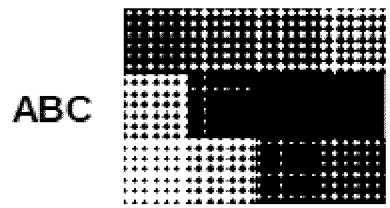
FIGS. 6A, 6B and 6C collectively are an illustration of data, compressed palette based upon the data, the palette, 1-D LUT for each channels and availability bits of different available 1-D LUT value combinations, wherein some of the 1-D LUT value combinations are used in the palette, in accordance with an embodiment of the present disclosure.

In FIG. 6A, an example of representing data to be encoded in an interleaved format for channels A, B and C is shown at a bottom region of the diagram and an image is shown at a top region of the diagram.

Figure 6B:
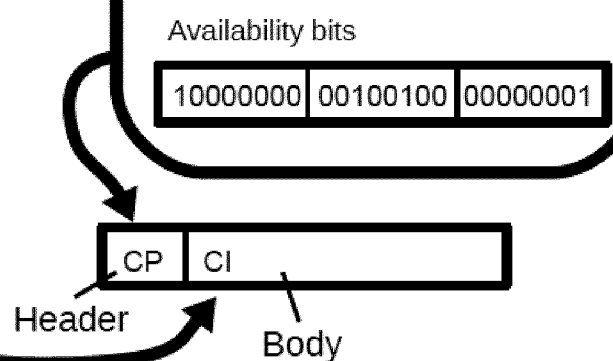

An example of a lossy method of encoding data, which is illustrated in FIG. 6A, is provided in FIG. 6B, in accordance with an embodiment of the present disclosure. Referring next to FIG. 6B, the data to be encoded is represented in three planes associated with channels A, B and C. For the values present in the data to be encoded, it is feasible to generate a lossy palette defined by an index parameter value I, and values for the channels A, B and C, as illustrated. The palette can, for example, be described by a collection of 1-dimensional look-up-tables (1-D LUT), wherein each of the channels A, B and C has its associated 1-D LUT as shown.

By employing the palette and its index parameter values 'I', it is feasible to represent the data to be encoded as lossy encoded data (E2), wherein the encoded data (E2) includes a header portion that includes compressed palette data, denoted by "CP", and a body portion that includes compressed data as compressed index values based upon palette, denoted by "CI". Different portions of CP and/or CI data are optionally further encoded by using entropy-encoding methods, for example, such as range coding or VLC coding.

As shown in FIG. 6B, in the compressed palette "CP", palette entry values are provided consecutively without any other values in between, namely as a coherent chunk of data. In other words, as the palette entry values are delivered in a specific order, their corresponding index values are not required to be delivered from an encoder to a corresponding decoder, and are known implicitly.

Figure 6C:
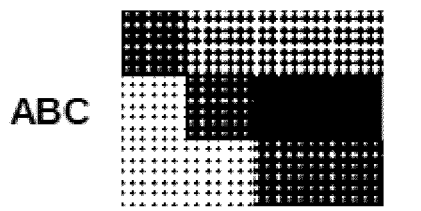

An example of a decoded data generated from the lossy encoded data of FIG. 6B is illustrated in FIG. 6C, wherein the decoded data is represented, for channels A, B and C, in an interleaved format shown at a bottom region of the diagram and as an image shown at a top region of the diagram.

Methods associated with FIG. 4A to FIG. 6B are usefully employed in an encoder for encoding input data (D1) to generate corresponding encoded data (E2), and an inverse of the methods is usefully employed when decoding the encoded data (E2) to generate corresponding decoded data (D3). An example of decoded data is shown in FIG. 6C. In FIG. 5, two upper images represent the data to be encoded and corresponding decoded data as per a lossless mode of operation.

Referring next to FIG. 7A, there is illustrated how a three-channel palette of FIGS. 6A and 6B can be represented by a 3-D LUT with three indices 0 to 3. These indices point to four interleaved 'A, B, C' color palette entries.

In FIG. 7B, there is illustrated a form in which palette entry values in the 3-D LUT depicted in FIG. 7A are delivered consecutively to an entropy encoder.

In FIG. 7C, there is illustrated how necessary header information and the entropy-encoded 3-D LUT are inserted into the encoded data (E2). In the illustrated example, the header includes information indicative of the entropy-encoding method employed (for example, a code word indicating the entropy-encoding method), the length of compressed palette data represented by 'L1', optionally the length that subsequently decompressed palette data will have, and other optional data, for example, the maximum index. After the header, the entropy-encoded palette data follows.

Figure 4B:
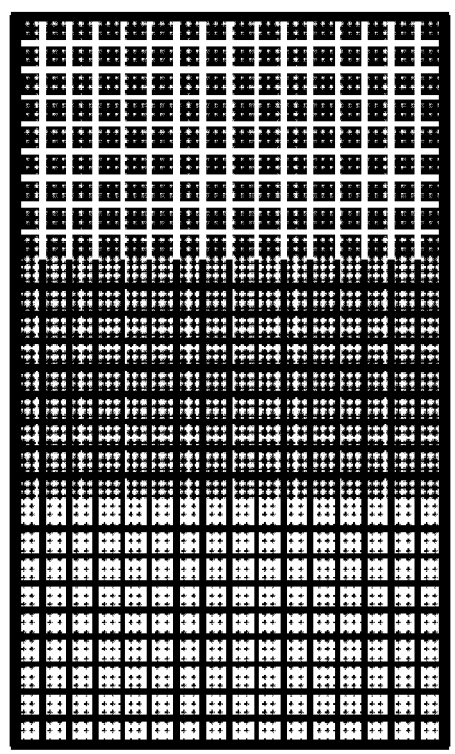
Figure 4C:
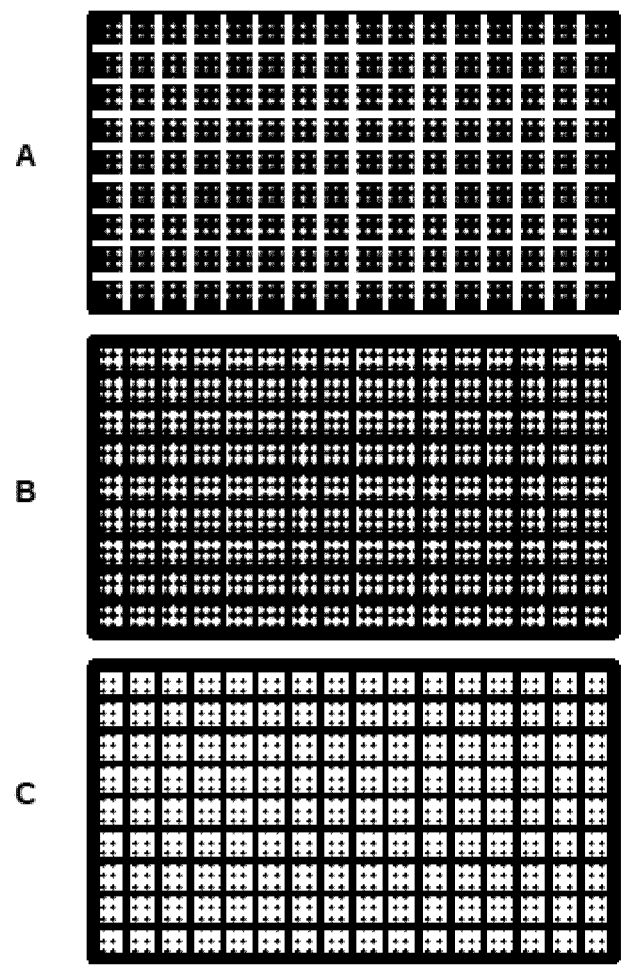

In FIG. 7D, there is shown the length in bytes of the sections of encoded data (E2) as illustrated with reference to FIG. 7C. The header includes four bytes of which:
(a) a first header byte expresses the code word indicating the entropy-encoding method (for example, such as "emRange"), and has a numeric value '17';
(b) a second header byte expresses the length of compressed palette data, and has a numeric value '5', denoting a length of five bytes;
(c) an optional third header byte, expresses the length of the decompressed palette data (for example, as depicted in FIG. 4B), and has a numeric value '12', as in 4×3; and
(d) an optional fourth header byte expresses the maximum index, and has a numeric value '3'. After the header, five bytes of the entropy-encoded palette data follow.

FIGS. 7A to 7D provide illustrations of how the data representative of a given palette is compressed.

Referring next to FIGS. 8A to 8C, there is shown how a given palette is utilized in encoding data values of an original image, namely the input data (D1), using indexes that refer to ordinal numbers of palette entries of the given palette.

In FIG. 8A, there are shown the indices of an image or block with 4×3 pixels. The values of the indices run from '0' to '3', which indicates that there are four palette entries in the given palette, and therefore four different sets of values.

In FIG. 8B, there is shown how the values of the indices of the image can be represented in a serial form, with a bit depth set to '2' for the index values. The possible index values are thus '00', '01', '10' and '11'.

In FIG. 8C, there is shown how the serial form of the index values depicted in FIG. 8B can be signalled using only three bytes, as compared with twelve bytes required originally. If the three bytes were to be understood as 8-bit integers, then the values would be 127, 26 and 5. The method used to represent 2-bit index values as bytes can, for example, be called "cmMaxIndexCopy", in which the 2-bit index values are inserted one after the other, either Most Significant Byte (MSB) first or Least Significant Byte (LSB) first, in a manner that four 2-bit index values comprise one 8-bit byte. Executing the "cmMaxIndexCopy" method decreases the data size, even though it does not reduce entropy. Therefore, this method can be called an "entropy-coding method", and the same applies also to Range coding or VLC coding. This is because the purpose of entropy-encoding methods is to decrease the data size to approach the entropy inherent in the data. In contrast, the purpose of entropy modifiers is to reduce the entropy of the data, prior to entropy-coding.

Figure 9:
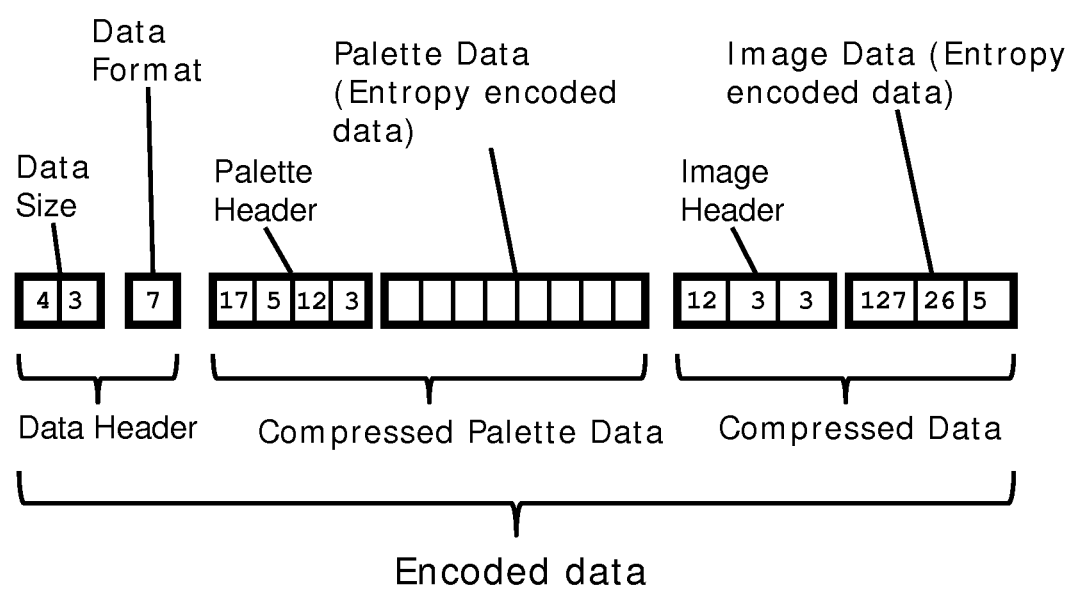
FIG. 9 is an illustration of how encoded data (E2) is assembled, and which sections the encoded data (E2) includes.

Referring next to FIG. 9, there is illustrated an example composition of encoded data (E2). The encoded data (E2) includes a data header, compressed palette data and compressed data. The data header includes a data size section, wherein values '4' and '3' refer to dimensions of an input image (4×3), and a data format section, which is a numeric designation of a format employed (for example, ffRGBLUT, wherein "RGB" indicates that there are three colour channels in the order R, G and B and "LUT" indicates that a given palette is compressed using LUT coding). The compressed palette data is the same as the example of compressed palette whose construction and composition has been illustrated in conjunction with FIGS. 7A to 7D. The compressed data is the same as the example of compressed index data whose construction and composition has been illustrated in conjunction with FIGS. 8A to 8C. Both the palette entry values of the given palette and their indices have at this point been separately entropy-encoded and inserted into the encoded data (E2). The overall size of this example encoded data (E2), including headers, is now 20 bytes (=3+3+8+3+3 bytes). It is to be noted that these 20 bytes now express the same image that needed 36 bytes (=4×3×3 bytes) in FIG. 6B.

It is also to be noted that if the name of the format were to have expressed the count of palette entries or the bit depth required by the indexes that refer to the ordinal numbers of the palette entries, then there would have been no need to insert the MaxIndex value '3' into the encoded data (E2). The format used in such a case could have been, for example, ffABCLUT_2 bit or ffABCLUT_3, and the data size of the encoded data (E2) would have shrunk to 19 bytes.

Figure 10:
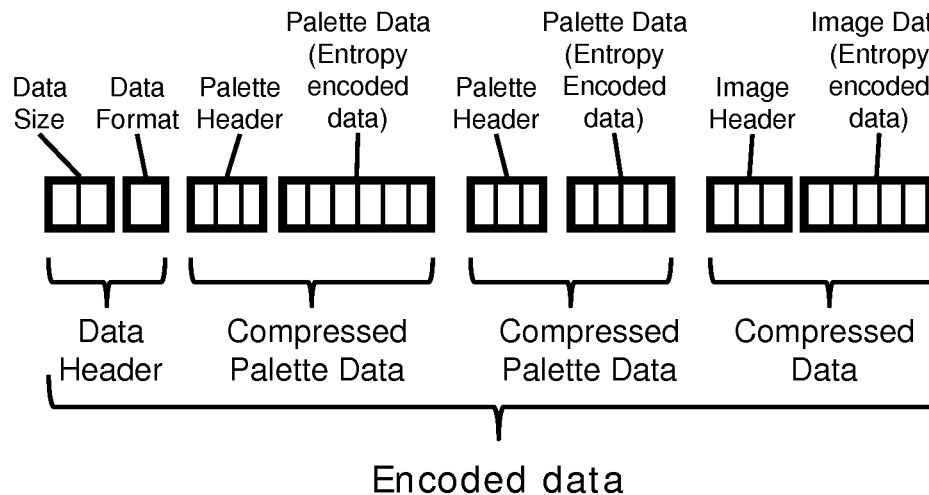
FIG. 10 is an illustration of two alternative ways for inserting compressed palette data of multiple different palettes and their associated index data into encoded data (E2).
Figure 10:
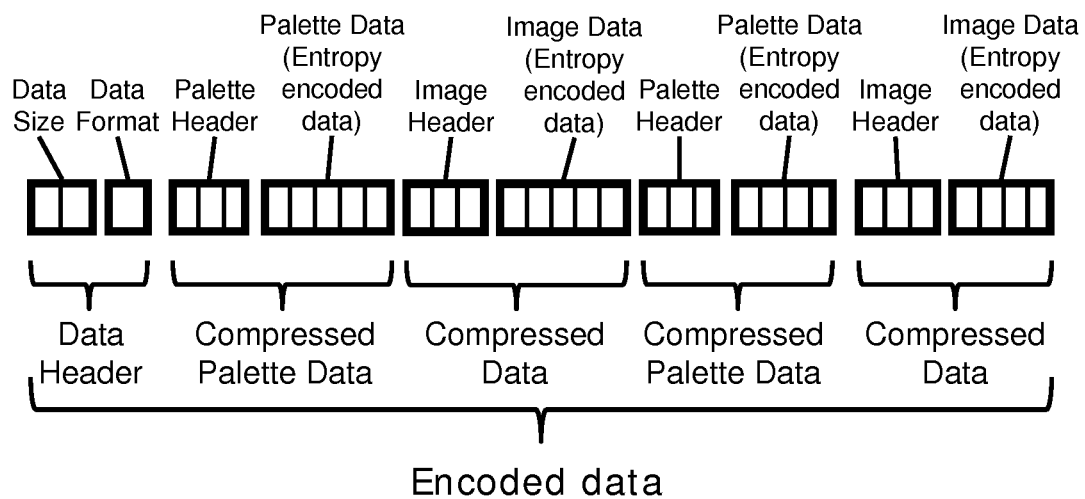

Referring next to FIG. 10, there are illustrated two alternative ways for inserting the compressed palette data of multiple different palettes and their associated index data into the encoded data (E2). The upper part of FIG. 10 depicts multiple (in this case, two) separately compressed palette data placed one after the other, and after the last (second) compressed palette data, all the sections of input data (D1) that have been compressed using the different palettes.

The lower part of FIG. 10 presents a case where compressed palette data of a first palette is followed by its associated index data that has been compressed using the first palette, then followed by compressed palette data of a second palette and its associated index data that has been compressed using the second palette, and so on.

It is to be noted that the sections 'Image Data' in the encoded data (E2) are the compressed indexes that refer to the ordinal numbers of the palette entries in the compressed palette data, which is associated with that particular 'Image Data' section. The individual sections of the encoded data (E2) have been explained in connection with FIGS. 7A to 8C.

FIGS. 4A to 10 are merely examples, which do not unduly limit the scope of the claims herein. A person skilled in the art will recognize many variations, alternatives, and modifications of embodiments of the present disclosure.

Expressions such as "one or more" and "at least one", for example when used as "one or more elements" and "at least one element", are to be interpreted to include an example where there is only one element present, and also to an alternative example where there are a plurality of elements present; such interpretation pertains as a default in the text of the present application, unless an alternative interpretation is explicitly stated.

Modifications to embodiments of the invention described in the foregoing are possible without departing from the scope of the invention as defined by the accompanying claims. Expressions such as "including", "comprising", "incorporating", "consisting of", "have", "is" used to describe and claim the present invention are intended to be construed in a non-exclusive manner, namely allowing for items, components or elements not explicitly described also to be present. Reference to the singular is also to be construed to relate to the plural.

I claim:

1. A method of encoding input data to generate corresponding encoded data, wherein the method includes:
   (i) encoding the input data, using at least one palette, into a plurality of symbols in the encoded data, wherein the plurality of symbols represent data as defined by the input data and the at least one palette, and each palette of the at least one palette includes a respective set of palette entry values and a corresponding set of indices, each index in the corresponding set of indices associated with a corresponding palette entry value of the respective set of palette entry values; and
   (ii) compressing, for each palette of the at least one palette, the respective set of palette entry values into a corresponding compressed palette in a lossless manner for inclusion into the encoded data, wherein the corresponding compressed palette includes the respective set of palette entry values in compressed form, without the corresponding set of indices, arranged according to a specific order in a consecutively adjacent manner within the encoded data, the specific order allowing a decoder device to deduce the corresponding set of indices associated with the respective set of palette entry values, wherein the compressing comprises: compressing a plurality of channels of the palette, wherein the corresponding compressed palette includes, for each channel of the plurality of channels, a corresponding set of channel entry values in compressed form, without the corresponding set of indices, arranged according to a specific order in a consecutively adjacent manner within the encoded data, and wherein the encoded data includes availability data indicative of combinations of channel entry values used to encode the input data.

2. The method of claim 1, characterized in that the method includes generating the corresponding compressed palette in a dynamically changing format depending upon content or data structure present in the input data, during encoding of the input data.

3. The method of claim 1, characterized in that the availability information is represented by way of at least one of: ordinal numbers of used or unused combinations, bits.

4. A method of decoding encoded data to generate corresponding decoded data, wherein the method includes:
decompressing each compressed palette of at least one compressed palette included in the encoded data to determine a respective set of palette entry values, each compressed palette including the respective set of palette entry values in compressed form, without the corresponding set of indices, arranged according to a specific order in a consecutively adjacent manner within the encoded data, wherein the compressed palette includes a plurality of channels and the corresponding compressed palette includes, for each channel of the plurality of channels, a corresponding set of channel entry values in compressed form, without the corresponding set of indices, arranged according to a specific order in a consecutively adjacent manner within the encoded data, and wherein the encoded data includes availability data indicative of combinations of channel entry values to be used to decode the encoded data;
deducing, for each compressed palette of the at least one compressed palette, based on the specific order of the respective set of palette entry values, the corresponding set of indices, wherein for each compressed palette of the at least one compressed palette a corresponding decompressed palette is defined using the respective set of palette entry values and the deduced corresponding set of indices; and
employing at least one decompressed palette to decode a plurality of symbols in the encoded data to generate the decoded data, the plurality of symbols representing data defined by input data.

5. The method of claim 4, characterized in that the method includes generating the decompressed palette in a dynamically changing format during decoding of the encoded data.

6. The method of claim 1, characterized in that the availability information is represented by way of at least one of: ordinal numbers of used or unused combinations, bits.

7. An encoder device, including a memory and at least one processor, for encoding input data to generate corresponding encoded data, wherein the encoder device is operable to:
encode, using at least one palette, the input data into a plurality of symbols in the encoded data, wherein the plurality of symbols represent data as defined by the input data and the at least one palette, and each palette of the at least one palette includes a respective set of palette entry values and a corresponding set of indices, each index in the corresponding set of indices associated with a corresponding palette entry value of the respective set of palette entry values; and
compress, for each palette of the at least one palette, the respective set of palette entry values into a corresponding compressed palette in a lossless manner for inclusion into the encoded data, wherein the corresponding compressed palette includes the respective set of palette entry values in compressed form, without the corresponding set of indices, arranged according to a specific order in a consecutively adjacent manner within the encoded data, the specific order allowing a decoder device to deduce the corresponding set of indices associated with the respective set of palette entry values, wherein the compressing comprises: compressing a plurality of channels of the palette, wherein the corresponding compressed palette includes, for each channel of the plurality of channels, a corresponding set of channel entry values in compressed form, without the corresponding set of indices, arranged according to a specific order in a consecutively adjacent manner within the encoded data, and wherein the encoded data includes availability data indicative of combinations of channel entry values used to encode the input data.

8. The encoder device of claim 7, characterized in that the encoder device is operable to generate the corresponding compressed palette in a dynamically changing format depending upon content or data structure present in the input data, during encoding of the input data.

9. The encoder device of claim 8, characterized in that the availability information is represented by way of at least one of: ordinal numbers of used or unused combinations, bits.

10. A decoder device, including a memory and at least one processor, for decoding encoded data to generate corresponding decoded data, wherein the decoder device is operable to:
decompress each compressed palette of at least one compressed palette included in the encoded data to determine a respective set of palette entry values, each compressed palette including the respective set of palette entry values in compressed form, without the corresponding set of indices, arranged according to a specific order in a consecutively adjacent manner within the encoded data, wherein the compressed palette includes a plurality of channels and the corresponding compressed palette includes, for each channel of the plurality of channels, a corresponding set of channel entry values in compressed form, without the corresponding set of indices, arranged according to a specific order in a consecutively adjacent manner within the encoded data, and wherein the encoded data includes availability data indicative of combinations of channel entry values to be used to decode the encoded data;
deduce, for each compressed palette of the at least one compressed palette, based on the specific order of the respective set of palette entry values, the corresponding set of indices, wherein for each compressed palette of the at least one compressed palette a decompressed palette is defined using the respective set of palette entry values and the deduced corresponding set of indices; and
employ at least one decompressed palette to decode a plurality of symbols in the encoded data to generate the decoded data, the plurality of symbols representing data as defined by input data.

11. The decoder device of claim 10, characterized in that the decoder device is operable to generate the decompressed palette in a dynamically changing format during decoding of the encoded data.

12. The decoder device of claim 10, characterized in that the availability information is represented by way of at least one of: ordinal numbers of used or unused combinations, bits.

13. A codec device including:
at least one encoder device including a first memory and at least one first processor, and at least one decoder device including a second memory and at least one second processor, the at least one encoder device for encoding input data to generate corresponding encoded data, wherein the at least one encoder device is operable to:
  encode, using at least one palette, the input data into a plurality of symbols in the encoded data, wherein the plurality of symbols represent data as defined by input data and the at least one palette, and each palette of the at least one palette includes a respective set of palette entry values and a corresponding set of indices, each index in the corresponding set of indices associated with a corresponding palette entry value of the respective set of palette entry values; and
  compress, for each palette of the at least one palette, the respective set of palette entry values into a corresponding compressed palette of at least one compressed palette in a lossless manner for inclusion into the encoded data, wherein the corresponding compressed palette includes the respective set of palette entry values in compressed form, without the corresponding set of indices, arranged according to a specific order in a consecutively adjacent manner within the encoded data, the specific order allowing the at least one decoder device to deduce the index values of a the corresponding set of indices,
the at least one decoder device for decoding the encoded data to generate corresponding decoded data, wherein the at least one decoder device is operable to:
  decompress, for each palette of the at least one palette, the corresponding compressed palette of the at least one compressed palette included in the encoded data to determine the respective set of palette entry values;
  deduce, for each palette of the at least one palette, based on the specific order of the respective set of palette entry values, the corresponding set of indices, wherein for each palette of the at least one palette a decompressed palette is defined using the respective set of palette entry values and the deduced corresponding set of indices; and
  employ the at least one palette to decode the plurality of symbols in the encoded data to generate the decoded data, the plurality of symbols representing the data defined by the input data,
wherein the compressing comprises: compressing a plurality of channels of the palette, wherein the corresponding compressed palette includes, for each channel of the plurality of channels, a corresponding set of channel entry values in compressed form, without the corresponding set of indices, arranged according to a specific order in a consecutively adjacent manner within the encoded data, and wherein the encoded data includes availability data indicative of combinations of channel entry values used to encode the input data, and the decoder device is operable to use the availability data to decode the encoded data.

14. A computer program product comprising a non-transitory computer-readable storage medium having computer-readable instructions stored thereon, the computer-readable instructions being executable by a computerized device comprising processing hardware to execute a method comprising:
  encoding, using at least one palette, input data to generate corresponding encoded data comprising a plurality of symbols, wherein the plurality of symbols represent data as defined by input data and the at least one palette, and each palette of the at least one palette includes a respective set of palette entry values and a corresponding set of indices, each index in the corresponding set of indices associated with a corresponding palette entry value of the respective set of palette entry values; and
  compressing, for each palette of the at least one palette, the respective set of palette entry values into a corresponding compressed palette in a lossless manner for inclusion into the encoded data, wherein the corresponding compressed palette includes the respective set of palette entry values in compressed form, without the corresponding set of indices, arranged according to a specific order in a consecutively adjacent manner within the encoded data, the specific order allowing a decoder device to deduce the corresponding set of indices associated with the respective set of palette entry values, wherein the compressing comprises: compressing a plurality of channels of the palette, wherein the corresponding compressed palette includes, for each channel of the plurality of channels, a corresponding set of channel entry values in compressed form, without the corresponding set of indices, arranged according to a specific order in a consecutively adjacent manner within the encoded data, and wherein the encoded data includes availability data indicative of combinations of channel entry values used to encode the input data.

15. A computer program product comprising a non-transitory computer-readable storage medium having computer-readable instructions stored thereon, the computer-readable instructions when executed by one or more processors cause the one or more processors to:
  decompress each compressed palette of at least one compressed palette included in the encoded data to determine a respective set of palette entry values, each compressed palette including the respective set of palette entry values in compressed form, without the corresponding set of indices, arranged according to a specific order in a consecutively adjacent manner within the encoded data, wherein the compressed palette includes a plurality of channels and the corresponding compressed palette includes, for each channel of the plurality of channels, a corresponding set of channel entry values in compressed form, without the corresponding set of indices, arranged according to a specific order in a consecutively adjacent manner within the encoded data, and wherein the encoded data includes availability data indicative of combinations of channel entry values to be used to decode the encoded data;
  deduce, for each compressed palette of the at least one compressed palette, based on the specific order of the respective set of palette entry values, the corresponding set of indices, wherein for each compressed palette of the at least one compressed palette a decompressed palette is defined using the respective set of palette entry values and the deduced corresponding set of indices; and employ at least one decompressed palette to decode a plurality of symbols in the encoded data to generate the decoded data, the plurality of symbols representing data as defined by input data.

* * * * *